(12) United States Patent
Furuse et al.

(10) Patent No.: US 11,719,596 B2
(45) Date of Patent: Aug. 8, 2023

(54) GAS LEAK SENSING DEVICE, SETTING METHOD FOR GAS LEAK SENSING, GAS LEAK SENSING METHOD, AND TANGIBLE MEDIUM

(71) Applicant: COSMO INSTRUMENTS CO., LTD., Tokyo (JP)

(72) Inventors: Akio Furuse, Tokyo (JP); Satoru Sasaki, Tokyo (JP)

(73) Assignee: COSMO INSTRUMENTS CO., LTD., Tokyo (JP)

( * ) Notice: Subject to any disclaimer, the term of this patent is extended or adjusted under 35 U.S.C. 154(b) by 23 days.

(21) Appl. No.: 17/365,391

(22) Filed: Jul. 1, 2021

(65) Prior Publication Data

US 2022/0082469 A1    Mar. 17, 2022

(30) Foreign Application Priority Data

Sep. 14, 2020  (JP) ................................ 2020-153483

(51) Int. Cl.
*G01M 3/32*        (2006.01)
*G01F 5/00*        (2006.01)

(52) U.S. Cl.
CPC ........... *G01M 3/3263* (2013.01); *G01F 5/005* (2013.01)

(58) Field of Classification Search
CPC ........ G01M 3/3263; G01M 3/26; G01F 5/005
See application file for complete search history.

(56) References Cited

FOREIGN PATENT DOCUMENTS

| JP | 2000121486 A | * | 4/2000 |
| JP | 4112340 B2 | * | 7/2008 |
| WO | 2014/184895 | | 11/2014 |

OTHER PUBLICATIONS

Cosmo Instrument Co.,Ltd., "Air Leak Tester", General Catalog, Jan. 2021, 36 pages.

* cited by examiner

*Primary Examiner* — Tarun Sinha
(74) *Attorney, Agent, or Firm* — Greenblum & Bernstein, P.L.C.

(57) ABSTRACT

A gas leak sensing device includes a constant flow rate control valve, a pressurization control valve, a supply-side gas circuit, a master-side gas circuit, a workpiece-side gas circuit, an equal pressure valve, an exhaust valve, a test pressure sensor, and a differential pressure sensor. The supply-side gas circuit is connected with the constant flow rate control valve and the pressurization control valve. The equal pressure valve performs opening and closing between the supply-side gas circuit and the master-side gas circuit and opening and closing between the supply-side gas circuit and the workpiece-side gas circuit. The exhaust valve performs opening and closing between the workpiece-side gas circuit and outside. The test pressure sensor detects pressure in the supply-side gas circuit. The differential pressure sensor detects a differential pressure between the master-side gas circuit and the workpiece-side gas circuit.

18 Claims, 15 Drawing Sheets

PRIOR ART

| SONIC NOZZLE'S PIPE INNER DIAMETER | PRIMARY PRESSURE kPa | DIFFERENTIAL PRESSURE Pa |
|---|---|---|
| Φ0.5 | 300 | 220 |
| | 350 | 280 |
| | 400 | 350 |
| | 450 | 420 |
| | 500 | 500 |

GAS LEAK SENSING DEVICE, SETTING METHOD FOR GAS LEAK SENSING, GAS LEAK SENSING METHOD, AND TANGIBLE MEDIUM

TECHNICAL FIELD

The present invention relates to gas leak sensing devices for improving the reliability of gas leak sensing, setting methods for gas leak sensing, gas leak sensing methods, and tangible media.

BACKGROUND ART

Various gas leak sensing devices are known as instruments for checking whether there is leakage of gas from a workpiece under test or not by supplying pressurized gas to the workpiece under test (International Publication No. WO2014/184895 (hereinafter referred to as Patent Literature 1), and General Catalog, Cosmo Instruments Co. Ltd., [searched on Aug. 28, 2020], or the internet <https://www-.cosmo-k.co.jp/document-download/>). Referring to FIG. 1, an outline of a gas leak sensing device 900 is described. Although the type of gas for use is not limited, the gas is air in this example. Accordingly, the designation "air leak sensing device" is appropriate. However, the designation "gas leak sensing device" is used in order not to lose generality.

A gas leak sensing device 900 includes a pressure reducing valve 210, a pressure sensor 213, a first control valve 221, a second control valve 223, a third control valve 225, a first gas circuit 21, a second gas circuit 22, a third gas circuit 23, a fourth gas circuit 24, a fifth gas circuit 25, a sixth gas circuit 26, a differential pressure sensor 250, a pressure sensor 253, a processing unit 910, and a silencer 40. The first control valve 221 in this example is a normally closed valve with one intake port and two exhaust ports. The second control valve 223 in this example is a normally open valve with two intake ports and one exhaust port. The third control valve 225 in this example is a normally open valve with one intake port and one exhaust port. As control of valves is well known, it is not described herein. In this example, processing unit 910 controls these control valves.

A gas source 200 supplies pressurized gas to one end of the first gas circuit 21. The other end of the first gas circuit 21 is connected with one end of the pressure reducing valve 210, which serves to maintain the stability of a primary pressure of the gas leak sensing device 900. The first gas circuit 21 is a metal tube, for example.

The other end of the pressure reducing valve 210 is connected with one end of the second gas circuit 22 and the other end of the second gas circuit 22 is connected with the intake port of the first control valve 221. The second gas circuit 22 is a metal tube, for example. The pressure sensor 213 for measuring the primary pressure of the gas leak sensing device 900 is connected with the second gas circuit 22. Measurements of the pressure sensor 213 are input to the processing unit 910.

One end of the third gas circuit 23 is connected with one of the exhaust ports of the first control valve 221. A workpiece under test 32 is connected to the other end of the third gas circuit 23. The third gas circuit 23 has two conduits in addition to a conduit connecting the first control valve 221 and the workpiece under test 32. These two conduits branch from the conduit that connects the first control valve 221 and the workpiece under test 32. The end of one conduit is connected with one end of the differential pressure sensor 250. The end of the other conduit is connected with one of the intake ports of the second control valve 223. In this manner, the third gas circuit 23 provides communication between the first control valve 221, the second control valve 223, the differential pressure sensor 250, and the workpiece under test 32. The third gas circuit 23 is a metal tube, for example.

One end of the fourth gas circuit 24 is connected with the other exhaust port of the first control valve 221. A master 33 as a reference object with no leakage is connected to the other end of the fourth gas circuit 24. The fourth gas circuit 24 has two conduits in addition to a conduit connecting the first control valve 221 and the master 33. These two conduits branch from the conduit that connects the first control valve 221 and the master 33. The end of one conduit is connected with the other end of the differential pressure sensor 250. The end of the other conduit is connected with the other intake port of the second control valve 223. In this manner, the fourth gas circuit 24 provides communication between the first control valve 221, the second control valve 223, the differential pressure sensor 250, and the master 33. The fourth gas circuit 24 is a metal tube, for example. Measurements of the differential pressure sensor 250 are input to the processing unit 910.

One end of the fifth gas circuit 25 is connected with the exhaust port of the second control valve 223 and the other end of the fifth gas circuit 25 is connected with the intake port of the third control valve 225. The pressure sensor 253 is connected with the fifth gas circuit 25. The fifth gas circuit 25 is a metal tube, for example. Measurements of the pressure sensor 253 are input to the processing unit 910.

One end of the sixth gas circuit 26 is connected to the exhaust port of the third control valve 225, with the silencer 40 for reducing exhaust sound from the gas leak sensing device 900 attached at the other end of the sixth gas circuit 26.

With the foregoing arrangement, when the first control valve 221 is in an open state, the gas source 200, the first gas circuit 21, the second gas circuit 22, the third gas circuit 23, and the fourth gas circuit 24 are in communication with each other. When the first control valve 221 is in a closed state, communication between the second gas circuit 22 and the third gas circuit 23 is cut off and communication between the second gas circuit 22 and the fourth gas circuit 24 is also cut off. That is, when the first control valve 221 is in a closed state, gas from the gas source 200 is not supplied to the third gas circuit 23 and the fourth gas circuit 24.

When the second control valve 223 is in an open state, the third gas circuit 23, the fourth gas circuit 24, and the fifth gas circuit 25 are in communication with each other. When the second control valve 223 is in a closed state, communication between the third gas circuit 23 and the fifth gas circuit 25 is cut off and communication between the fourth gas circuit 24 and the fifth gas circuit 25 is also cut off.

When the third control valve 225 is in an open state, the fifth gas circuit 25 and the sixth gas circuit 26 are in communication with each other. When the third control valve 225 is in a closed state, communication between the fifth gas circuit 25 and the sixth gas circuit 26 is cut off.

The processing unit 910 controls the operation of the first, the second, and the third control valves 221, 223, 225 under a program, monitors a supply pressure detected by the pressure sensor 213 and a test pressure detected by the pressure sensor 253, and determines whether there is leakage of gas from the workpiece under test 32 or not based on a detected differential pressure acquired by the differential pressure sensor 250 at a certain timing.

An operation procedure of the gas leak sensing device 900 is as follows. A state where the processing unit 910 is controlling nothing (an initial state) is when the first control valve 221 is closed and the second control valve 223 and the third control valve 225 are opened. Here, the third gas circuit 23, the fourth gas circuit 24, the fifth gas circuit 25, and the sixth gas circuit 26 are at atmospheric pressure. The pressure of the second gas circuit 22 is set at a predetermined pressure by the pressure reducing valve 210. Under these conditions, the master 33 is connected to the fourth gas circuit 24 and the workpiece under test 32 is connected to the third gas circuit 23.

The processing unit 910 places the third control valve 225 in a closed state while keeping the second control valve 223 in an open state, and thereafter places the first control valve 221 in an open state for a predefined amount of time. As a result, pressurized air of the gas source 200 is supplied to the master 33 and the workpiece under test 32 through the first gas circuit 21, the second gas circuit 22, the third gas circuit 23, and the fourth gas circuit 24.

Next, the processing unit 910 places the first control valve 221 in a closed state while not changing the states of the second control valve 223 and the third control valve 225, and waits for a reduction in pressure variation for a predefined amount of time. If the pressure sensor 253 detects a pressure drop during it, the processing unit 910 determines that "the workpiece under test 32 has a leak".

After this process, processing unit 910 places the second control valve 223 in a closed state while keeping the first control valve 221 and the third control valve 225 in a closed state. The processing unit 910 monitors the differential pressure detected by the differential pressure sensor 250. If the workpiece under test 32 has a hole in it, air escapes from the workpiece under test 32 to create a pressure difference between the pressure of the third gas circuit 23 and the pressure of the fourth gas circuit 24. That is, the pressure of the third gas circuit 23 becomes lower than the pressure of the fourth gas circuit 24. Accordingly, if the differential pressure sensor 250 detects a differential pressure greater than a predefined first reference value after elapse of a predefined amount of time since the closing of the second control valve 223, the processing unit 910 determines that "the workpiece under test 32 has a leak" and finishes the test. If a differential pressure greater than the first reference value is not detected after elapse of the predefined amount of time, the processing unit 910 resets a detection output of the differential pressure sensor 250 to 0 at the point and switches a pressure detection range to a range of higher sensitivity to continue differential pressure detection. When a detected differential pressure is equal to or smaller than a second reference value after elapse of the predefined amount of time, the processing unit 910 determines that "the workpiece under test 32 has no leakage". When the differential pressure is greater than the second reference value, the processing unit 910 determines that "the workpiece under test 32 has a leak" and finishes the test.

SUMMARY OF THE INVENTION

A result of gas leak sensing with a gas leak sensing device having some anomaly is unreliable. In addition, as the workpiece under test is attached to the gas leak sensing device using a clamp that achieves both sealing and connection simultaneously, a result of gas leak sensing when the clamp has some anomaly is also unreliable even if the gas leak sensing device is operating normally. Reliability is also lower in a case where an internal volume of one workpiece under test is different from that of another workpiece under test because leakage detection sensitivity varies.

To verify the reliability of gas leak sensing, a leakage detection sensitivity with a precise micro-leakage generator attached to a gas leak sensing device can be measured, for example. However, since this verification is substantially gas leak sensing, it takes as much time as normal gas leak sensing. Furthermore, strictly speaking, it is not verification in an environment in which gas leak sensing on the workpiece under test is actually performed. Thus, such verification is typically carried out at intervals of multiple executions of gas leak sensing. Accordingly, if the presence of some anomaly is ascertained through verification, the reliability of all runs of gas leak sensing that have been performed between the last verification and the current verification would be lost.

Given these issues, an object of the present invention is to provide a technique that improves the reliability of gas leak sensing.

A gas leak sensing device according to the present invention includes a constant flow rate control valve, a pressurization control valve, a supply-side gas circuit, a master-side gas circuit, a workpiece-side gas circuit, an equal pressure valve, an exhaust valve, a test pressure sensor, and a differential pressure sensor. The constant flow rate control valve controls the supply of gas at a constant flow rate. The pressurization control valve controls the supply of gas at test pressure. The supply-side gas circuit is connected with the constant flow rate control valve and the pressurization control valve. A master is connected to the master-side gas circuit. A workpiece is connected to the workpiece-side gas circuit. The equal pressure valve performs opening and closing between the supply-side gas circuit and the master-side gas circuit and opening and closing between the supply-side gas circuit and the workpiece-side gas circuit. The exhaust valve performs opening and closing between the workpiece-side gas circuit and outside. The test pressure sensor detects pressure in the supply-side gas circuit. The differential pressure sensor detects a differential pressure between the master-side gas circuit and the workpiece-side gas circuit.

A gas leak sensing method according to the present invention uses the gas leak sensing device described above. In advance, a non-defective workpiece is connected to the workpiece-side gas circuit, and while having the equal pressure valve opens and the exhaust valve closed, an equivalent internal volume is determined as a large leak reference volume by opening the constant flow rate control valve for a first predetermined time to supply gas. Then, a workpiece under test is connected to the workpiece-side gas circuit. The gas leak sensing method includes a first leak sensing step, a second leak sensing step, a third leak sensing step, and a differential pressure sensor sensitivity checking step. The first leak sensing step senses the presence or absence of a leak by while having the equal pressure valve open and the exhaust valve closed, opening the constant flow rate control valve for the first predetermined time to supply gas and then closing the constant flow rate control valve, detecting a pressure with the test pressure sensor, and comparing an equivalent internal volume determined based on the detected pressure to the large leak reference volume. The second leak sensing step senses the presence or absence of a leak while having the equal pressure valve open and the exhaust valve closed, opening the pressurization control valve for a second predetermined time to supply gas and then closing the pressurization control valve, detecting a pressure with the test pressure sensor, and checking whether a change in the detected pressure is within a predefined normal range. The third leak sensing step senses the presence or absence of a leak by, after the second leak sensing step has finished, detecting a pressure difference with the differential pressure sensor for a predefined amount of time while having the equal pressure valve closed, and checking the detected pressure difference. The differential pressure sensor sensitivity checking step checks whether the pressure difference detected by the differential pressure sensor is in a normal range while supplying gas with the equal pressure valve open, the exhaust valve open, and the constant flow rate control valve open.

The gas leak sensing device and gas leak sensing method of the present invention can improve the reliability of gas leak sensing because they can test the gas leak sensing device with the workpiece under test attached to the gas leak sensing device.

DETAILED DESCRIPTION OF THE EMBODIMENTS

Figure 1:
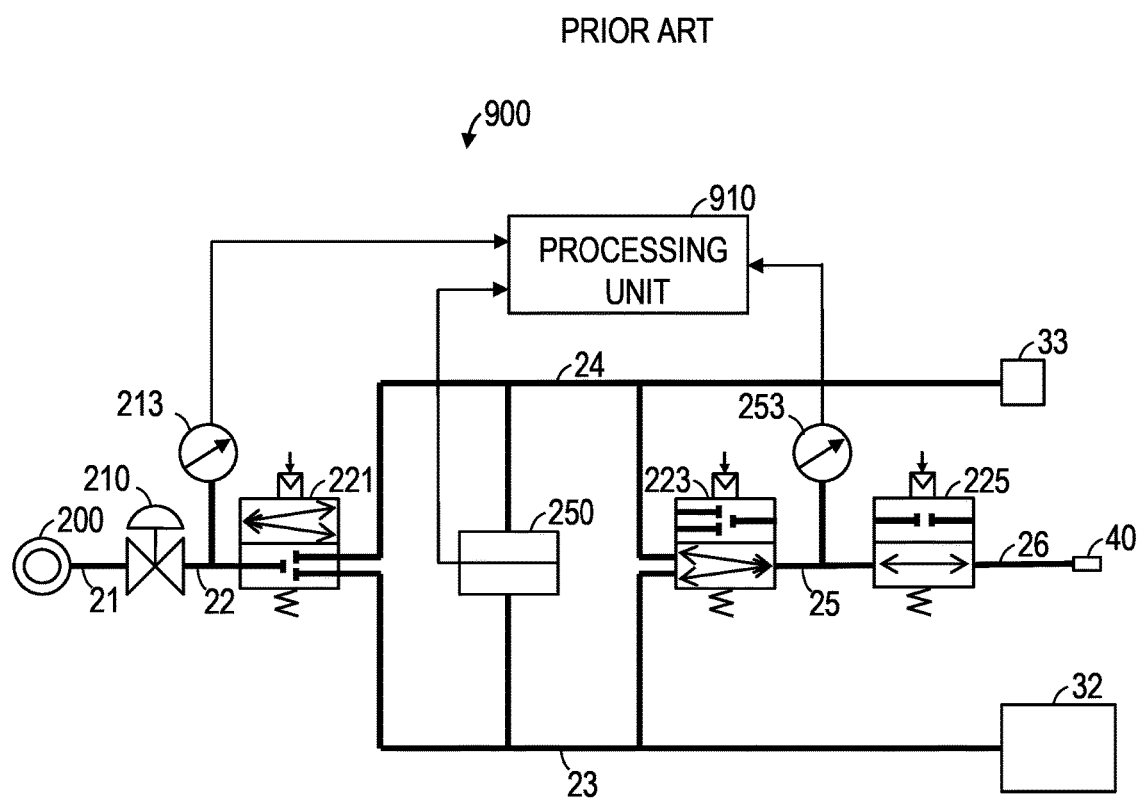
FIG. 1 shows an example of the functional configuration of a conventional gas leak sensing device.

An embodiment of the present invention is described in detail below. Components with the same function are denoted with the same reference characters and overlapping descriptions are not provided. The description herein does not cover components that are used in practice but are inessential in the description and understanding of the embodiment, such as a dust filter, an auto-leak calibrator (a device for converting a differential pressure change to a leakage flow rate change), and the like. For example, the term "connect" used in the description is not limited to meaning that the components relevant to the term "connect" are directly connected (in other words, connected without via a separate component). The term "connect" used in the description is intended to also encompass a case where components relevant to the term "connect" are indirectly connected (in other words, connected via a separate component) as desired for the practical needs.

First Embodiment

<Configuration of Gas Leak Sensing Device>

Figure 2:
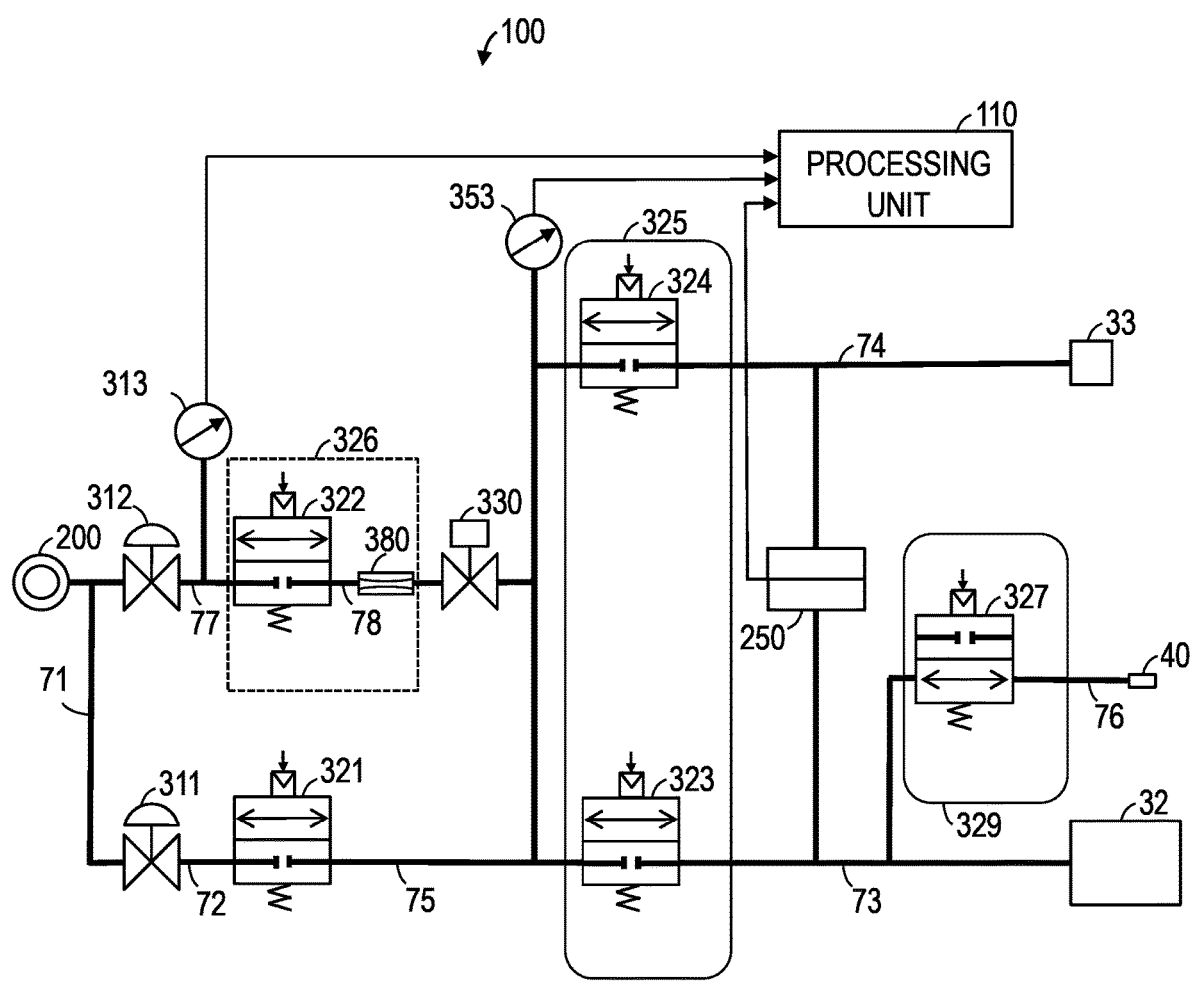
FIG. 2 shows an example of the functional configuration of a gas leak sensing device according to a first embodiment.

FIG. 2 shows an example of the functional configuration of a gas leak sensing device according to a first embodiment. A gas leak sensing device 100 includes a test pressure regulating valve 311, a primary pressure regulating valve 312, a primary pressure sensor 313, a test pressure sensor 353, a differential pressure sensor 250, a constant flow rate control valve 326, a pressurization control valve 321, an equal pressure valve 325, an exhaust valve 329, a source gas circuit 71, a pressurized gas circuit 72, a workpiece-side gas circuit 73, a master-side gas circuit 74, a supply-side gas circuit 75, an exhaust gas circuit 76, a primary pressure gas circuit 77, a silencer 40, and a processing unit 110. The source gas circuit 71, the pressurized gas circuit 72, the workpiece-side gas circuit 73, the master-side gas circuit 74, the supply-side gas circuit 75, the exhaust gas circuit 76, and the primary pressure gas circuit 77 can be metal tubes.

The source gas circuit 71 is connected to the gas source 200 which supplies pressurized gas, and to an intake port of the test pressure regulating valve 311 and an intake port of the primary pressure regulating valve 312. The source gas circuit 71 serves to supply pressurized gas to the test pressure regulating valve 311 and the primary pressure regulating valve 312. The pressurized gas circuit 72 is connected to an exhaust port of the test pressure regulating valve 311 and an intake port of the pressurization control valve 321. The test pressure regulating valve 311 regulates the pressure of the gas supplied from the gas source 200 to a testing pressure and supplies it to the pressurized gas circuit 72. The primary pressure gas circuit 77 is connected to an exhaust port of the primary pressure regulating valve 312 and an intake port of the constant flow rate control valve 326. The primary pressure regulating valve 312 adjusts the pressure of gas so that gas of a constant flow rate can be supplied from the constant flow rate control valve 326. The primary pressure sensor 313 detects the pressure of gas in the primary pressure gas circuit 77.

The supply-side gas circuit 75 is connected to an exhaust port of the constant flow rate control valve 326, an exhaust port of the pressurization control valve 321, and an intake port of the equal pressure valve 325. A check valve 330 may be provided near the exhaust port of the constant flow rate control valve 326 in the supply-side gas circuit 75. The test pressure sensor 353 detects the pressure in the supply-side gas circuit 75. The master-side gas circuit 74 is connected to an exhaust port of the equal pressure valve 325 and the master 33. The workpiece-side gas circuit 73 is connected to an exhaust port of the equal pressure valve 325, an intake port of the exhaust valve 329, and the workpiece under test 32. The exhaust gas circuit 76 is connected to an exhaust port of the exhaust valve 329 and the silencer 40. The silencer 40 reduces exhaust sound.

The pressurization control valve 321 controls the supply of gas at a test pressure to the supply-side gas circuit 75. To "control supply of gas" means to switch between a state in which supply of gas is performed and a state in which supply of gas is stopped. The equal pressure valve 325 has a control valve 323 and a control valve 324. The control valve 323 performs opening and closing between the supply-side gas circuit 75 and the workpiece-side gas circuit 73. The control valve 324 performs opening and closing between the supply-side gas circuit 75 and the master-side gas circuit 74. The control valve 323 and the control valve 324 are normally closed. Although the control valve 323 and the control valve 324 can be either air-operated valves or electromagnetic valves, they are preferably air-operated valves. The exhaust valve 329 has a control valve 327. The control valve 327 performs opening and closing between the workpiece-side gas circuit 73 and outside. The control valve 327 is normally open. Although the control valve 327 can be either an air-operated valve or an electromagnetic valve, it is preferably an air-operated valve because it is a valve to which a differential pressure between the test pressure and the atmospheric pressure is applied. The differential pressure sensor 250 detects a differential pressure between the master-side gas circuit 74 and the workpiece-side gas circuit 73. The check valve 330 is a valve for preventing backflow when the test pressure is made higher than the primary pressure and can be an electromagnetic valve. If the test pressure is always lower than the primary pressure, the check valve 330 is not necessary.

To the processing unit 110, pressures detected by the primary pressure sensor 313, the test pressure sensor 353, and the differential pressure sensor 250 are input. Then, processing unit 110 controls the constant flow rate control valve 326, the pressurization control valve 321, the equal pressure valve 325, the exhaust valve 329, and the check valve 330.

<Principles of Testing of Gas Leak Sensing Device>

The constant flow rate control valve 326 controls the supply of gas of a constant flow rate. To "control supply of gas" means to switch between a state in which supply of gas is performed and a state in which supply of gas is stopped. The constant flow rate control valve 326 can be formed of an electromagnetic valve 322, a constant flow rate gas circuit 78, and a sonic nozzle 380, for example. An example of the sonic nozzle 380 (also called a critical nozzle or a sonic speed nozzle) can be a critical nozzle (a screw pipe) disclosed by Patent Literature 1. A feature of the sonic nozzle 380 is that the speed of gas flowing in the sonic nozzle 380 is at the speed of sound when the ratio between the primary pressure (an absolute pressure $p_1$) and a secondary pressure (an absolute pressure $p_2$) is equal to or smaller than a critical value. For example, the critical value of a screw pipe with a pipe inner diameter of $\phi 0.5$ is about 0.481, under which condition the sonic nozzle 380 discharges gas of a constant flow rate. Representing it as an expression, a constant flow rate is achieved when the relationship of Formula (1) holds.

As a specific example, when the primary pressure $p_1$ is 400 kPa (a gauge pressure of 300 kPa), the sonic nozzle 380 discharges gas of a constant flow rate at the secondary pressure $p_2$ equal to or smaller than 192 kPa (a gauge pressure of 92 kPa). For the sonic nozzle 380 with a pipe inner diameter of $\phi 0.5$, a flow rate Q of the sonic nozzle 380 in terms of the standard atmosphere is 10 L/min. Thus, for the sonic nozzle 380, the flow rate Q at the primary pressure (absolute pressure $p_1$) in terms of the standard atmosphere is known.

$$\frac{p_2}{p_1} < 0.481 \tag{1}$$

The flow rate of the sonic nozzle 380 is proportional to the primary pressure. The flow rate Q for the primary pressure (the absolute pressure) of $p_x$ can be calculated with Formula (2). Formula (2) also holds when $p_x = p_1$. The arrow in Formula (2) means that the value of Q on the right side is changed to the value of Q on the left side.

$$Q \leftarrow \frac{p_x}{p_1} \cdot Q \tag{2}$$

Since the flow rate Q [L/min] of the sonic nozzle 380 in terms of the standard atmosphere is also determined once the primary pressure (the absolute pressure $p_x$) of the sonic nozzle 380 is determined as mentioned above, a volume $V_T$ [L] of gas supplied by the sonic nozzle 380 in terms of the standard atmosphere is calculated with Formula (3). T [s] is gas supply time, namely an amount of time for which the sonic nozzle 380 is in operation. As the gas leak sensing device 100 is intended to check the presence or absence of an anomaly, a short time on the order of 0.01 s to 1 s is assumed as the gas supply time T [s].

$$V_T = T \cdot Q / 60 \tag{3}$$

Figure 3:
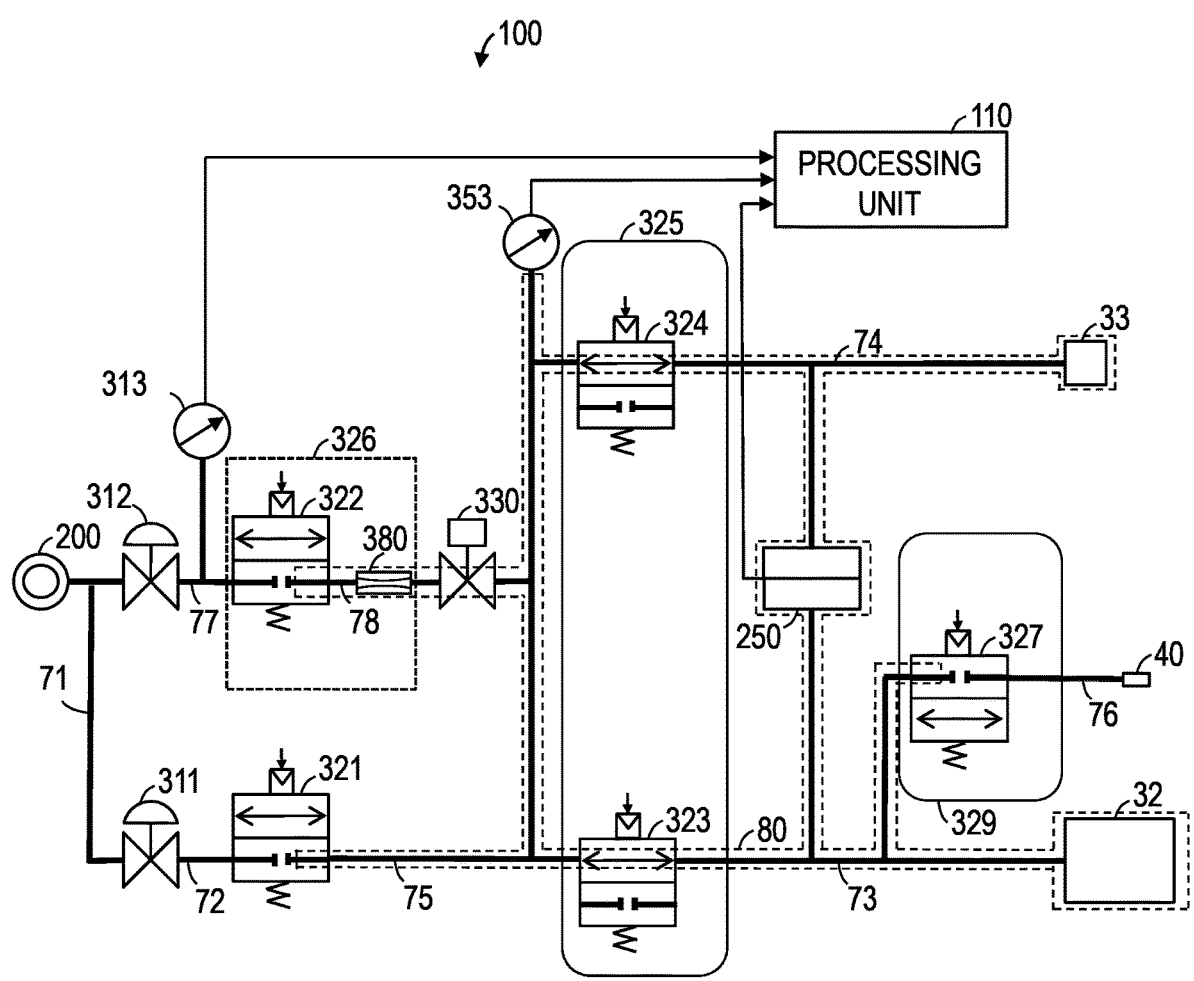
FIG. 3 shows a state of gas circuits in the gas leak sensing device according to the first embodiment during processing with a constant flow rate control valve.

FIG. 3 shows the state of the gas circuits in the gas leak sensing device 100 during processing with the constant flow rate control valve 326. This state is when the equal pressure valve 325 is opened and the exhaust valve 329 is closed. In this state, a closed gas circuit 80 is formed by the workpiece-side gas circuit 73, the master-side gas circuit 74, and the supply-side gas circuit 75. Formula (4) below holds, where $V_E$ [L] is the volume of the closed gas circuit 80, $P_0$ is the standard atmosphere value, and $P_A$ is a pressure value in the closed gas circuit 80 after the gas of the volume $V_T$ [L] in terms of the standard atmosphere is supplied to the closed gas circuit 80 by the sonic nozzle 380. The volume $V_E$ of the closed gas circuit 80 is a volume including a volume change due to the respective internal pressures of an object attached to the gas leak sensing device 100 (that is, a non-defective workpiece or the workpiece under test 32) and the differential pressure sensor 250, and is referred to by those skilled in the art as an "equivalent internal volume" of the closed gas circuit 80, for example. When $P_A \neq P_0$, Formula (5) holds. When $P_A = P_0$, it means that almost all of the gas supplied by the sonic nozzle 380 has leaked from the gas circuit 80, indicating the presence of a defect such as a crack in the gas circuit 80.

$$(V_E + V_T) \cdot P_0 = V_E \cdot P_A \tag{4}$$

$$V_E = V_T \cdot \frac{P_0}{P_A - P_0} \quad (5)$$

Thus, the gas leak sensing device 100 can be tested for any sensitivity anomaly by comparing a pressure value $P_G$ (an absolute pressure) in the closed gas circuit 80 after the gas of the volume $V_T$ is supplied via the sonic nozzle 380 to the closed gas circuit 80 which is formed with a non-defective workpiece to a pressure value $P_T$ (an absolute pressure) in the closed gas circuit 80 after the gas of the volume $V_T$ is supplied via the sonic nozzle 380 to the closed gas circuit 80 which is formed with the workpiece under test 32. If the difference between the pressure value $P_G$ (absolute pressure) and the pressure value $P_T$ (absolute pressure) is large, an anomaly of the gas leak sensing device 100 can be ascertained. This anomaly would stem from a crack in the gas circuit 80, the volume of the workpiece under test 32 different from the volume of a non-defective workpiece, a large leakage from the workpiece under test 32, a defect of a clamp, and the like, for example.

The volume $V_T$ [L] is controlled via the gas supply time T [s]. The gas supply time T [s] is defined as a value precalculated from Formula (3) to cause a predetermined pressure change $\Delta P = P_A - P_0$ or as the actual gas supply time when the pressure change $\Delta P$ is caused, for example.

In the present invention, the gas supply time T [s] is a short time on the order of 0.01 s to 1 s and the pressure of gas supplied by the sonic nozzle 380 propagates in the closed gas circuit 80 at the speed of sound, so that the pressure in the closed gas circuit 80 stabilizes in a short time. Also, when the volume $V_E$ of the closed gas circuit 80 is sufficiently large compared to the volume $V_T$ [L] of gas supplied by the sonic nozzle 380, the effect of adiabatic change due to the supply of the gas can be said to be extremely small. Even if the deformation of the workpiece under test 32 occurs from attachment of the workpiece under test 32 to the gas leak sensing device 100 with a clamp, the deformation typically stabilizes in a short time. Accordingly, the time required for testing the gas leak sensing device 100 for any anomaly is sufficiently shorter than the time required for gas leak sensing of the workpiece under test 32.

<Gas Leak Sensing Method>

Figure 4:
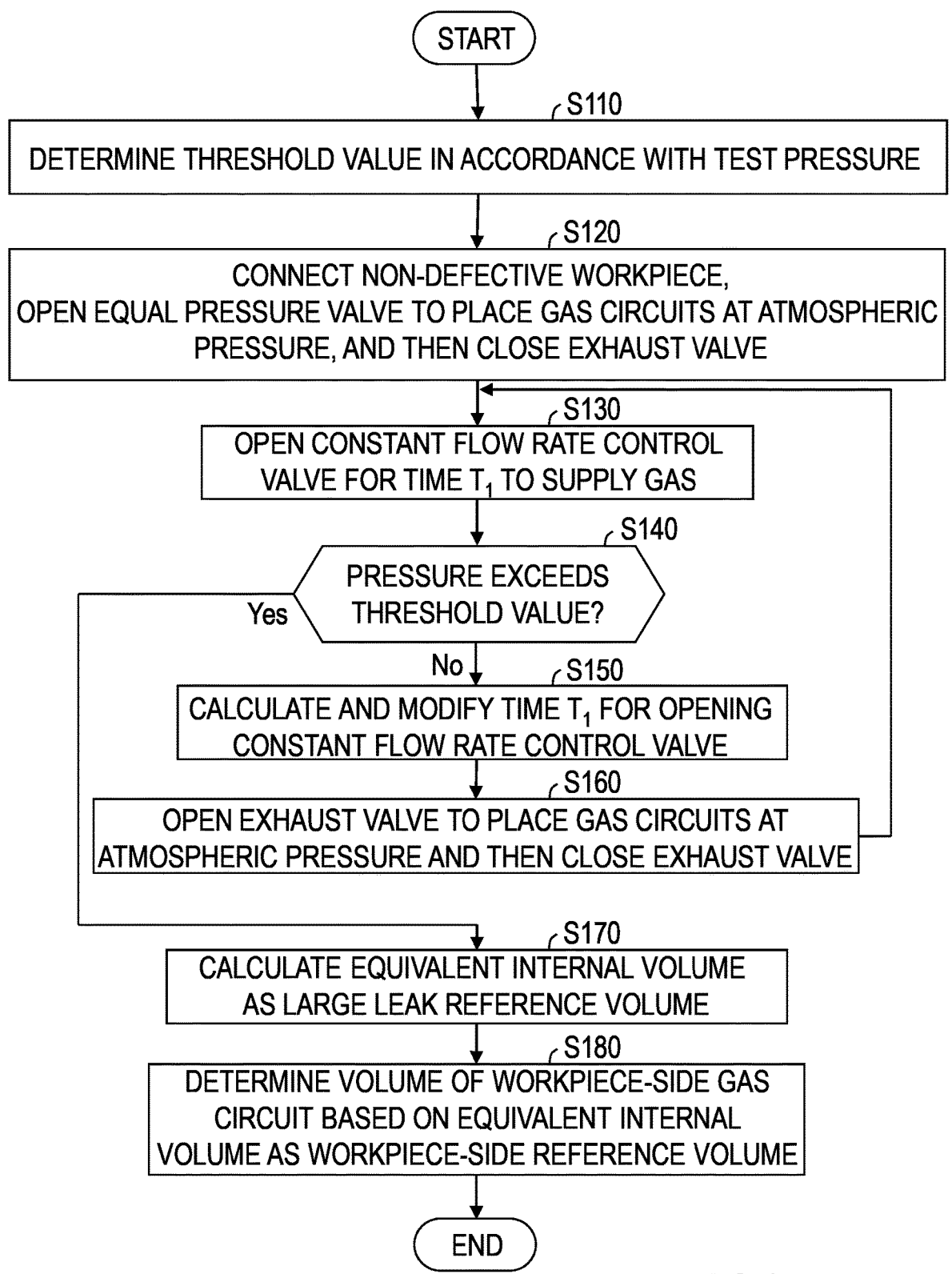
FIG. 4 shows a process flow of a setting method for gas leak sensing with the gas leak sensing device.
Figure 5:
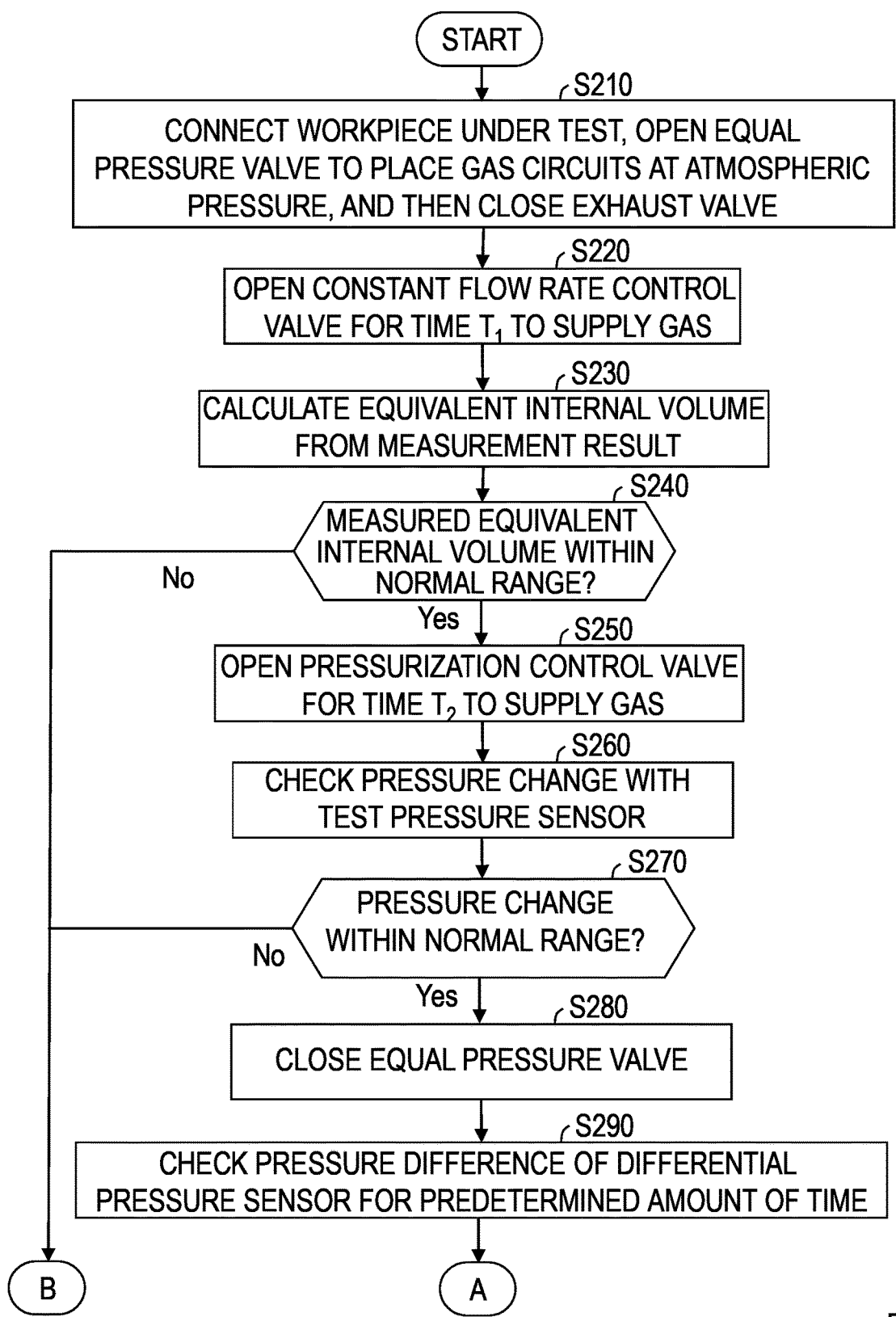
FIG. 5 is the first diagram showing a process flow of a gas leak sensing method with the gas leak sensing device.
Figure 6:
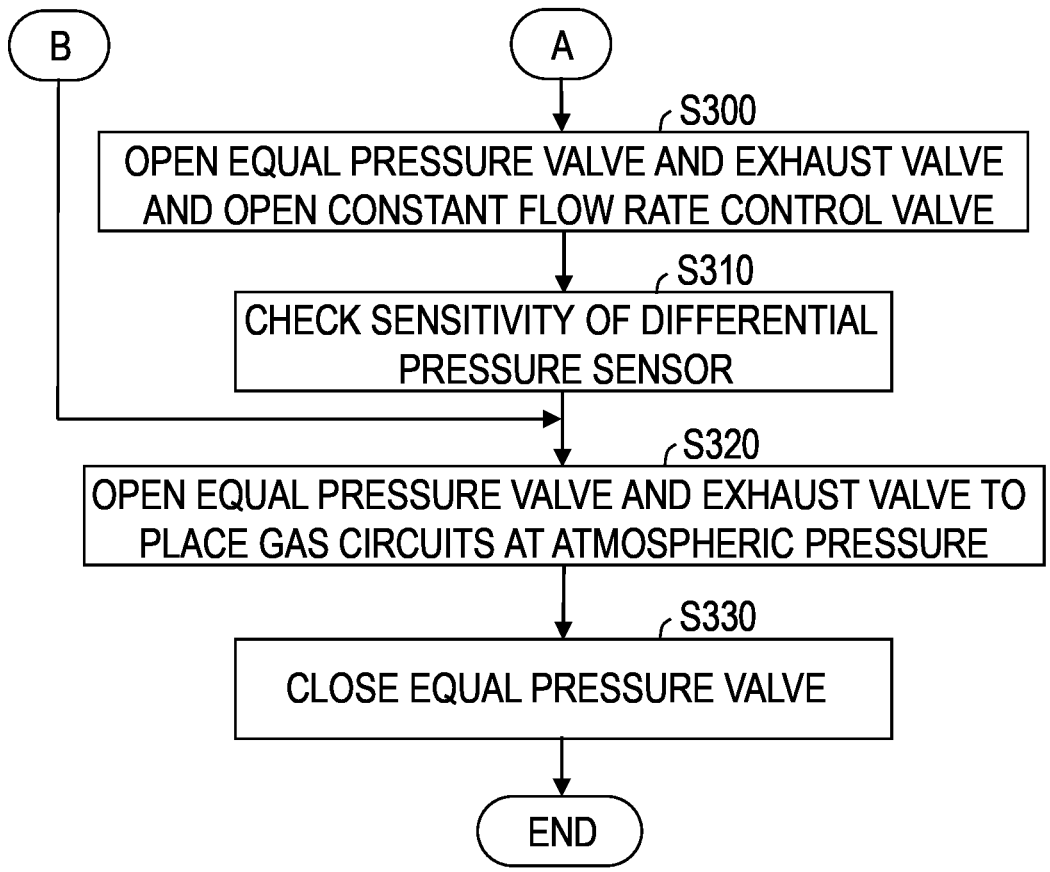
FIG. 6 is the second diagram showing the process flow of the gas leak sensing method with the gas leak sensing device in the first embodiment.

FIG. 4 shows a process flow of a setting method for gas leak sensing with the gas leak sensing device. FIGS. 5 and 6 show a process flow of a gas leak sensing method with the gas leak sensing device. The setting method for gas leak sensing with the gas leak sensing device 100 starts with connecting a non-defective workpiece to the workpiece-side gas circuit 73, upon which the processing unit 110 performs the following. The equal pressure valve 325 is opened and the exhaust valve 329 is closed. Then, the processing unit 110 determines an equivalent internal volume as a large leak reference volume by a pressure which is detected by the test pressure sensor 353 when gas is supplied by opening the constant flow rate control valve 326 for a first predetermined time $T_1$. The processing unit 110 also determines, as a workpiece-side reference volume, an equivalent internal volume of the workpiece-side gas circuit 73 with the non-defective workpiece being connected thereto from the large leak reference volume, using designed dimensions of the supply-side gas circuit 75 and the master-side gas circuit 74 and the like.

More specifically, a threshold value of pressure is determined in consideration of the test pressure required for a quality check of a workpiece (S110). The threshold value is a threshold value for checking the equivalent internal volume and can be determined to be an appropriate pressure lower than the test pressure. A non-defective workpiece is connected to the workpiece-side gas circuit 73. A "non-defective workpiece" means a workpiece of the same kind as the workpiece under test and having no hole that can cause a leak. Then, the processing unit 110 opens the equal pressure valve 325 to place the workpiece-side gas circuit 73 with the non-defective workpiece being connected thereto, the master-side gas circuit 74, and the supply-side gas circuit 75 at the atmospheric pressure, and thereafter closes the exhaust valve 329 (S120). In a case where the check valve 330 is present, the check valve 330 is placed in an open state. When the processing at step S120 ends, the closed gas circuit 80 at the atmospheric pressure has been formed (the state of FIG. 3). The processing unit 110 opens the constant flow rate control valve 326 for the first predetermined time $T_1$ to supply gas (S130). An initial value of the first predetermined time $T_1$ can be a minimum response time of the electromagnetic valve 322, for example. The processing unit 110 checks if the pressure sensed by the test pressure sensor 353 exceeds the threshold value determined at step S110 (S140).

When step S140 results in No, the processing unit 110 calculates and modifies the first predetermined time $T_1$ required for exceeding the threshold value based on the pressure sensed by the test pressure sensor 353 (S150). The processing unit 110 opens the exhaust valve 329 to place the workpiece-side gas circuit 73 with the non-defective workpiece being connected thereto, the master-side gas circuit 74, and the supply-side gas circuit 75 at the atmospheric pressure, and thereafter closes the exhaust valve 329 (S160). The processing at step S160 creates the same state as when step S120 has ended. Then, step S130 is performed with the modified first predetermined time $T_1$, and step S140 is repeated. Since it is executed by the first predetermined time $T_1$ calculated at step S150, step S140 at the second time normally results in Yes. If it results in No, step S150, S160, S130, and S140 can be repeated.

When step S140 is Yes, the processing unit 110 computes the equivalent internal volume of the closed gas circuit 80 formed by the workpiece-side gas circuit 73 with the non-defective workpiece being connected thereto, the master-side gas circuit 74, and the supply-side gas circuit 75 from the time $T_1$ and the pressure detected by the test pressure sensor 353, and records it as the large leak reference volume (S170). Since the internal volumes of the master-side gas circuit 74, the supply-side gas circuit 75, and the equal pressure valve 325 are known, the processing unit 110 determines the equivalent internal volume of the workpiece-side gas circuit 73 with the non-defective workpiece attached thereto from the equivalent internal volume of the closed gas circuit 80 in consideration of the volumes of the master-side gas circuit 74, the supply-side gas circuit 75, and the equal pressure valve 325, and records it as the workpiece-side reference volume (S180). More specifically, the volume of the master-side gas circuit 74 and the volume of the supply-side gas circuit 75 are determined from the designed dimensions of the master-side gas circuit 74 and the supply-side gas circuit 75 and the like also considering the volume within the equal pressure valve 325, and the workpiece-side reference volume can be determined as:

the workpiece-side reference volume=the large leak reference volume−(the volume of the master-side gas circuit 74+the volume of the supply-side gas circuit 75).

As described in FIG. 4, the processing unit 110 sets the large leak reference volume and the workpiece-side reference volume in advance. Then, the workpiece under test is connected to the workpiece-side gas circuit 73. In the gas leak sensing method shown in FIGS. 5 and 6, the processing unit 110 executes a first leak sensing step (S210, S220, S230, S240), a second leak sensing step (S250, S260, S270), a third leak sensing step (S280, S290), and a differential pressure sensor sensitivity checking step (S300, S310). After that, the processing unit 110 closes the constant flow rate control valve 326, opens the equal pressure valve 325 and the exhaust valve 329, and places the pressures of the workpiece-side gas circuit 73, the master-side gas circuit 74, and the supply-side gas circuit 75 at the atmospheric pressure (S320). As the exhaust valve 329 (the control valve 327) is normally open, the exhaust valve 329 assumes the state of step S320 once the processing unit 110 stops controlling the exhaust valve 329. Then, processing unit 110 closes the equal pressure valve 325 (S330). As the equal pressure valve 325 (the control valve 323 and the control valve 324) is normally closed, the equal pressure valve 325 assumes the state of step S330 once the processing unit 110 stops controlling the equal pressure valve 325. That is, the state of step S330 is created when processing unit 110 stops control on the gas leak sensing device 100.

In the first leak sensing step, the workpiece under test 32 is first connected to the workpiece-side gas circuit 73. The processing unit 110 opens the equal pressure valve 325 to place the workpiece-side gas circuit 73, the master-side gas circuit 74, and the supply-side gas circuit 75 at the atmospheric pressure, and thereafter places the exhaust valve 329 in a closed state (S210). In a case where check valve 330 is present, check valve 330 is placed in an open state. The processing unit 110 opens the constant flow rate control valve 326 for the first predetermined time $T_1$ to supply gas and then closes it (S220). The processing unit 110 detects a pressure with the test pressure sensor 353 and determines the equivalent internal volume based on the detected pressure (S230). The processing unit 110 senses the presence or absence of a leak by comparing the equivalent internal volume determined based on the detected pressure with the large leak reference volume (S240). If there is some large leakage in the gas leak sensing device 100 itself and the portion where the workpiece under test is attached, the detected pressure will be low and the determined equivalent internal volume will be greater than the large leak reference volume. Also, when the internal volume of the workpiece under test is different from the internal volume of a non-defective workpiece or another workpiece under test by a predetermined tolerance or more, the ratio between the equivalent internal volume determined and the large leak reference volume falls outside a ratio corresponding to the predefined tolerance. In step S240, by sensing the presence or absence of a leak with a defined tolerance of the ratio between the equivalent internal volume determined and the large leak reference volume, not only a leak from the gas leak sensing device 100 itself and the portion where the workpiece under test is attached but any anomaly of the internal volume of the workpiece under test can be sensed every time a workpiece under test is connected.

In the second leak sensing step, the processing unit 110 opens the pressurization control valve 321 for a second predetermined time $T_2$ to supply gas and closes it while having the equal pressure valve 325 open and the exhaust valve 329 closed (S250). In a case where check valve 330 is present, check valve 330 is to be closed before opening the pressurization control valve 321 in step S250. The second predetermined time $T_2$ may be defined so that the pressures of the workpiece-side gas circuit 73, the master-side gas circuit 74, and the supply-side gas circuit 75 are placed at the test pressure through this processing if the workpiece under test 32 and the gas leak sensing device 100 do not have a significant anomaly. The processing unit 110 detects a pressure with the test pressure sensor 353 and checks a change in the detected pressure (S260). The processing unit 110 senses the presence or absence of a leak by checking whether the change in the pressure is within a predefined normal range (S270). Normally, when the pressurization control valve 321 is opened to increase the pressures of the workpiece-side gas circuit 73, the master-side gas circuit 74, and the supply-side gas circuit 75 to the test pressure, the temperature will rise due to adiabatic change of gas. The temperature will then decrease. In step S270, the presence or absence of a leak is sensed taking into account reduction in pressure due to a decrease in temperature.

Figure 7:
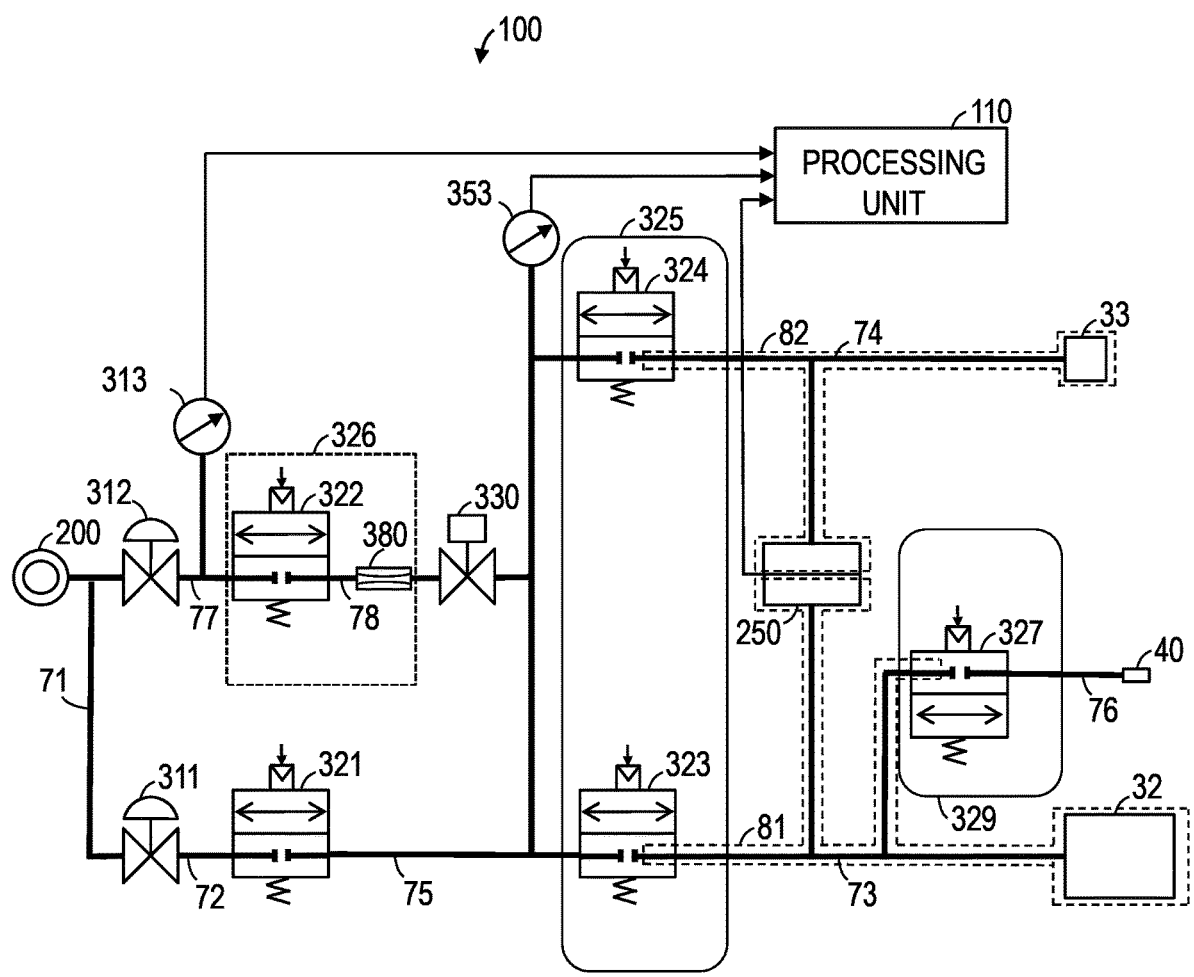
FIG. 7 shows the state of the gas circuits in the gas leak sensing device in the first embodiment when an equal pressure valve and an exhaust valve are closed.

In the third leak sensing step, the processing unit 110 closes the equal pressure valve 325 after the second leak sensing step is finished (S280). Performing step S280 results in the state shown in FIG. 7. FIG. 7 shows the state of the gas circuits when the equal pressure valve 325 and the exhaust valve 329 are closed. The workpiece-side gas circuit 73 with the workpiece under test 32 connected thereto is a closed gas circuit 81, and the master-side gas circuit 74 is a closed gas circuit 82. The processing unit 110 detects a pressure difference via the differential pressure sensor 250 for a predetermined amount of time while having the equal pressure valve 325 closed and the exhaust valve 329 closed, and checks the detected pressure difference (S290). The predetermined amount of time can be a time for the temperature of the gas in the workpiece-side gas circuit 73 to stabilize to a sufficient degree for checking a leak. In checking, the processing unit 110 may also take into consideration the set workpiece-side reference volume. More specifically, the change in the pressure difference detected by the differential pressure sensor 250 in step S290 is assumed to be the pressure change of the workpiece-side gas circuit 73, and a virtual leakage flow rate has given a constant temperature is determined as $Q_2$ [L/min] using the workpiece-side reference volume. The processing unit 110 can sense the presence or absence of a leak based on a virtual leakage flow rate $Q_2$.

Figure 8:
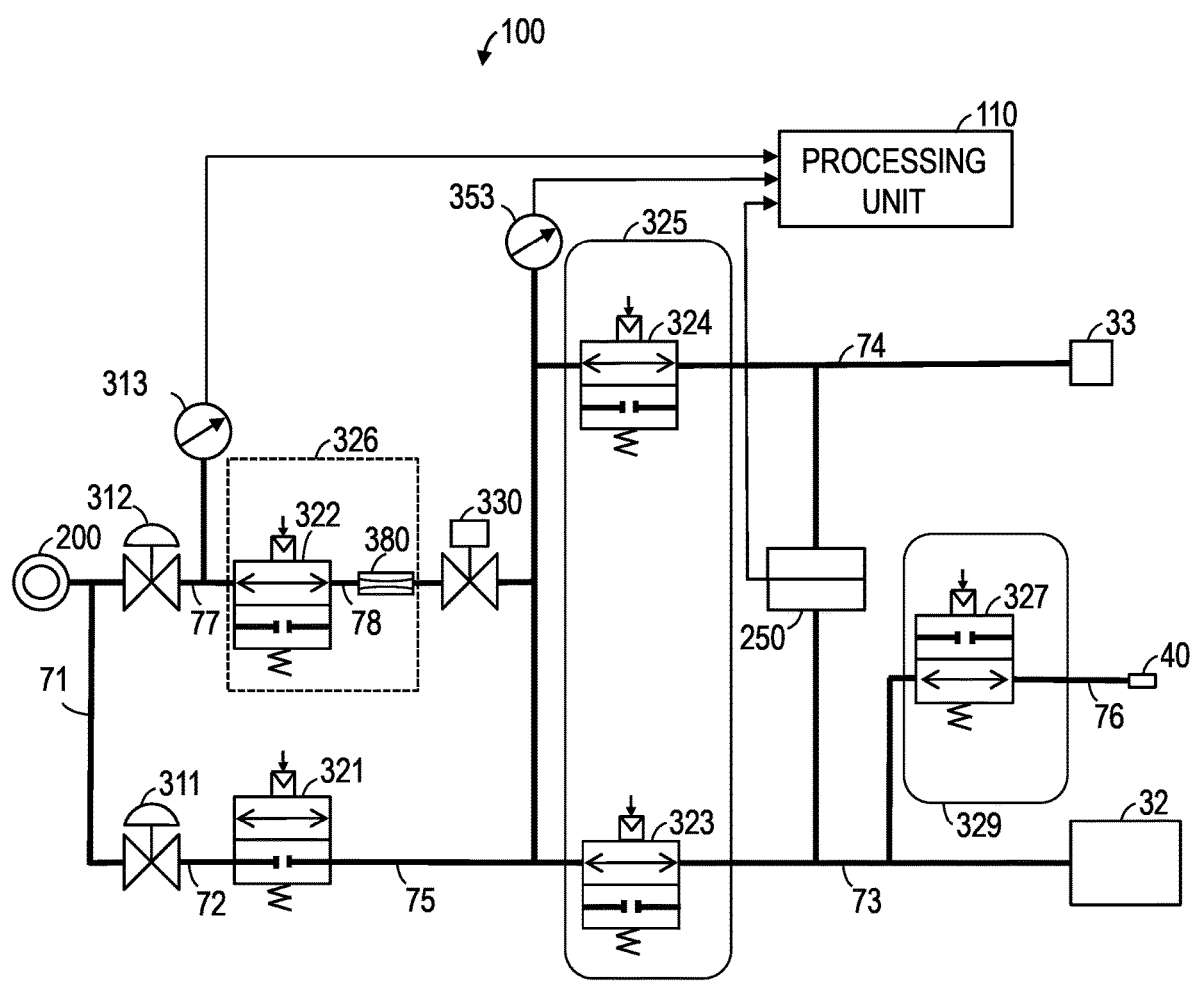
FIG. 8 shows the state of the gas circuits in the gas leak sensing device in the first embodiment when the equal pressure valve and the exhaust valve are opened and the constant flow rate control valve is opened.
Figures 9, 10:
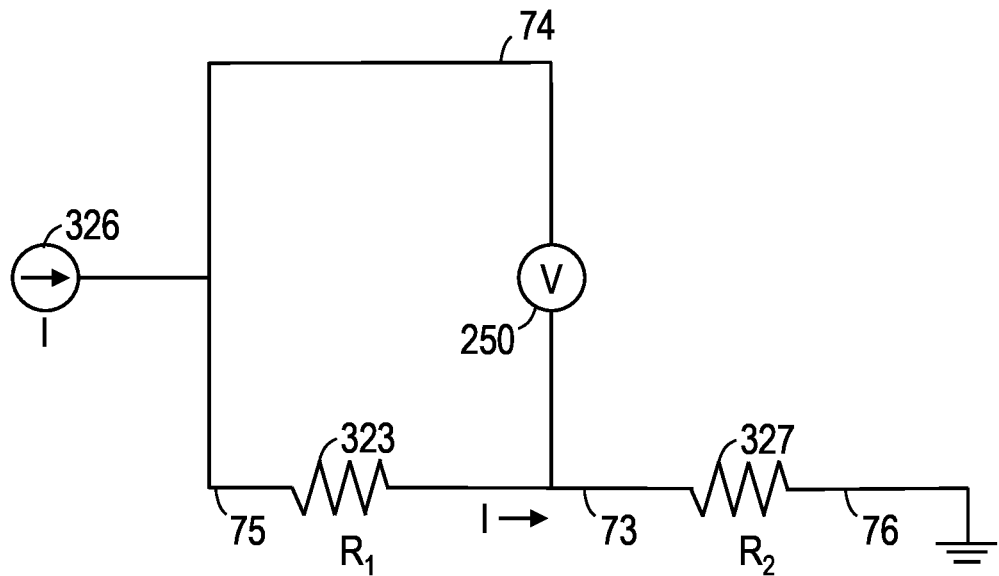
FIG. 9 shows an equivalent circuit of the gas circuits formed by the constant flow rate control valve, a control valve of the equal pressure valve, a control valve of the exhaust valve, and a differential pressure sensor.
FIG. 10 shows an example of primary pressures (gauge pressures) and differential pressures for a sonic nozzle with a pipe inner diameter of $\phi 0.5$.

In the differential pressure sensor sensitivity checking step, processing unit 110 opens the equal pressure valve 325, opens the exhaust valve 329, and opens the constant flow rate control valve 326 to have gas being supplied (S300). In a case where check valve 330 is present, check valve 330 is placed in an open state. FIG. 8 shows a state where the equal pressure valve 325 is opened, the exhaust valve 329 is opened, and the constant flow rate control valve 326 is opened. FIG. 9 shows an equivalent circuit of the gas circuits formed by the constant flow rate control valve 326, the control valve 323 of the equal pressure valve 325, the control valve 327 of the exhaust valve 329, and the differential pressure sensor 250. Gas of a constant flow rate I flow from the constant flow rate control valve 326. With no exhaust valve present on the master-side gas circuit 74 sides, the pressure of the master-side gas circuit 74 is the same as that of the supply-side gas circuit 75. Accordingly, the control valve 324 is omitted in FIG. 9. Gas of the constant flow rate I pass through the control valves 323, 327 to be exhausted from the exhaust gas circuit 76. The pressure of the workpiece-side gas circuit 73 is affected by a resistance of the control valve 323 to become lower than that of the supply-side gas circuit 75 by V ($=I \times R_1$). The processing unit 110 determines that the differential pressure sensor 250 is normal if the differential pressure sensed by the differential pressure sensor 250 agrees with V or if an error between it and V is within tolerance (S310). Otherwise, processing unit 110 determines that the differential pressure sensor 250 is not normal. FIG. 10 shows an example of primary pressures (gauge pressures) and differential pressures for a sonic nozzle with a pipe inner diameter of $\phi 0.5$. Note that the relationship between the primary pressure and the differential pressure is also dependent on the control valve 323. The gas leak sensing device 100 therefore can also check that the sensitivity of the differential pressure sensor 250 is normal at each gas leak sensing. Subsequently, processing unit 110 executes steps S320 and S330 as discussed above.

The gas leak sensing device and gas leak sensing method according to the first embodiment are capable of testing the gas leak sensing device in a short time with a workpiece under test connected to the gas leak sensing device. Thus, a leak test section (the gas leak sensing device itself and the portion where the workpiece under test is attached) can be tested every time a workpiece under test is attached. Accordingly, the reliability of gas leak sensing can be improved compared to conventional testing of gas leak sensing devices, which is performed once per multiple executions of tests on workpieces under test. Also, using an equivalent internal volume determined by utilizing a non-defective workpiece as the large leak reference volume, it is possible to sense a case where the internal volume of a workpiece under test is different from that of a non-defective workpiece under test. Further, the setting method for gas leak sensing in the first embodiment can set an environment in which the foregoing gas leak sensing method can be performed.

While the foregoing first embodiment described gas leak sensing of internal pressure type, which performs a leakage test by supplying gas to the inside of the workpiece under test, the present invention can also be applied to gas leak sensing of external pressure type, which performs a leakage test by supplying gas to the outside of the workpiece under test. In the case of gas leak sensing of external pressure type, a non-defective workpiece or the workpiece under test 32 is housed in a chamber connected with the workpiece-side gas circuit 73.

[First Modification]

Figure 11:
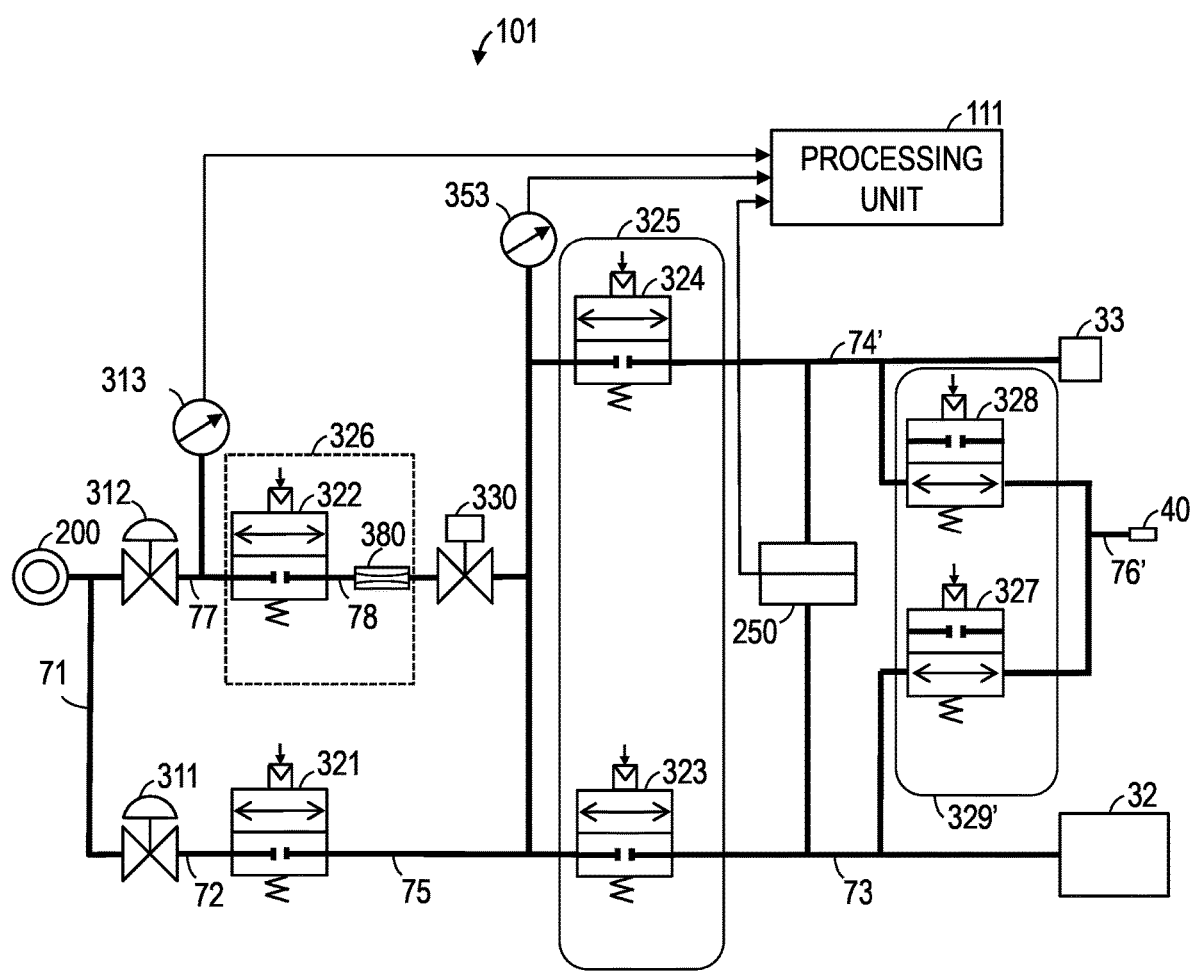
FIG. 11 shows an example of the functional configuration of a gas leak sensing device according to a first modification.

In the first embodiment, the exhaust valve 329 only included the control valve 327 for performing opening and closing between the workpiece-side gas circuit 73 and the outside. In a first modification, an exhaust valve 329' additionally includes a control valve 328 for performing opening and closing between a master-side gas circuit 74' and the outside. FIG. 11 shows an example of a functional configuration of a gas leak sensing device according to the first modification. A gas leak sensing device 101 includes the test pressure regulating valve 311, the primary pressure regulating valve 312, the primary pressure sensor 313, a test pressure sensor 353, the differential pressure sensor 250, the constant flow rate control valve 326, the pressurization control valve 321, the equal pressure valve 325, an exhaust valve 329', the source gas circuit 71, the pressurized gas circuit 72, the workpiece-side gas circuit 73, a master-side gas circuit 74', the supply-side gas circuit 75, an exhaust gas circuit 76', the primary pressure gas circuit 77, the silencer 40, and a processing unit 111. It may also include the check valve 330. The gas leak sensing device 101 differs in configuration from the gas leak sensing device 100 in that the exhaust valve 329' additionally includes the control valve 328, the master-side gas circuit 74' is additionally connected to the exhaust valve 329', the exhaust gas circuit 76' is additionally connected to the control valve 328, and the processing unit 111 additionally controls the control valve 328.

Figure 12:
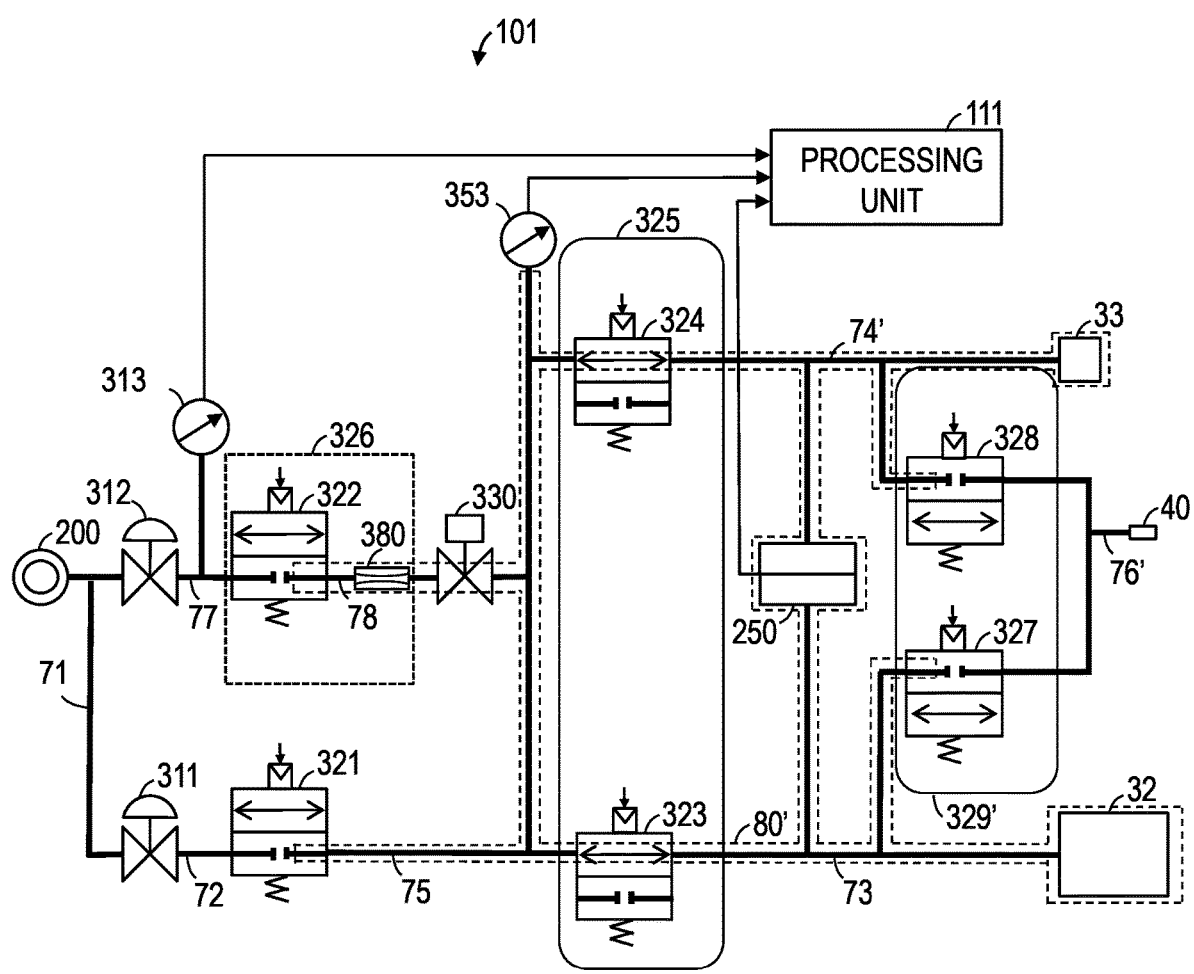
FIG. 12 shows the state of the gas circuits in the gas leak sensing device according to the first modification during processing with the constant flow rate control valve.
Figure 13:
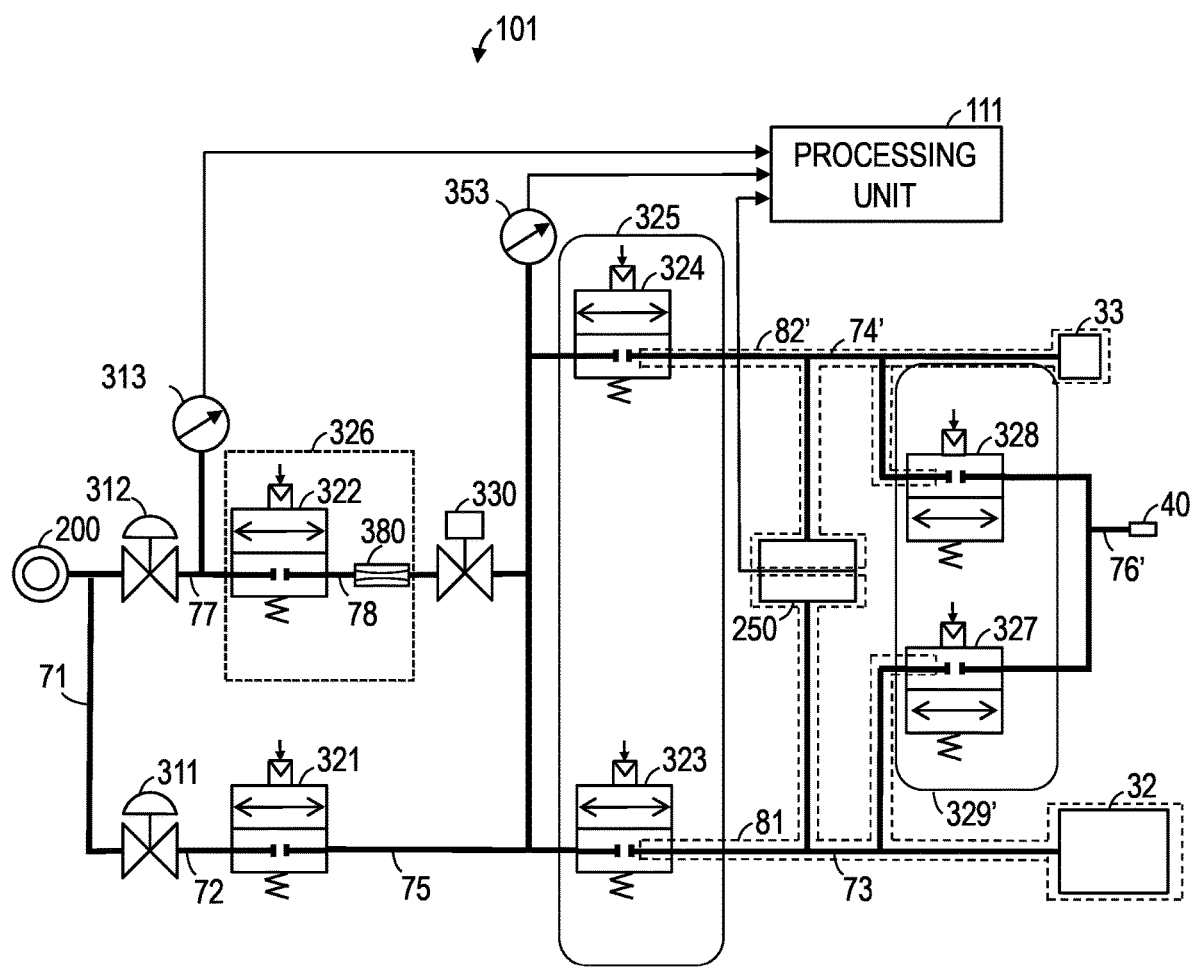
FIG. 13 shows the state of the gas circuits in the gas leak sensing device in the first modification when the equal pressure valve and the exhaust valve are closed.
Figure 14:
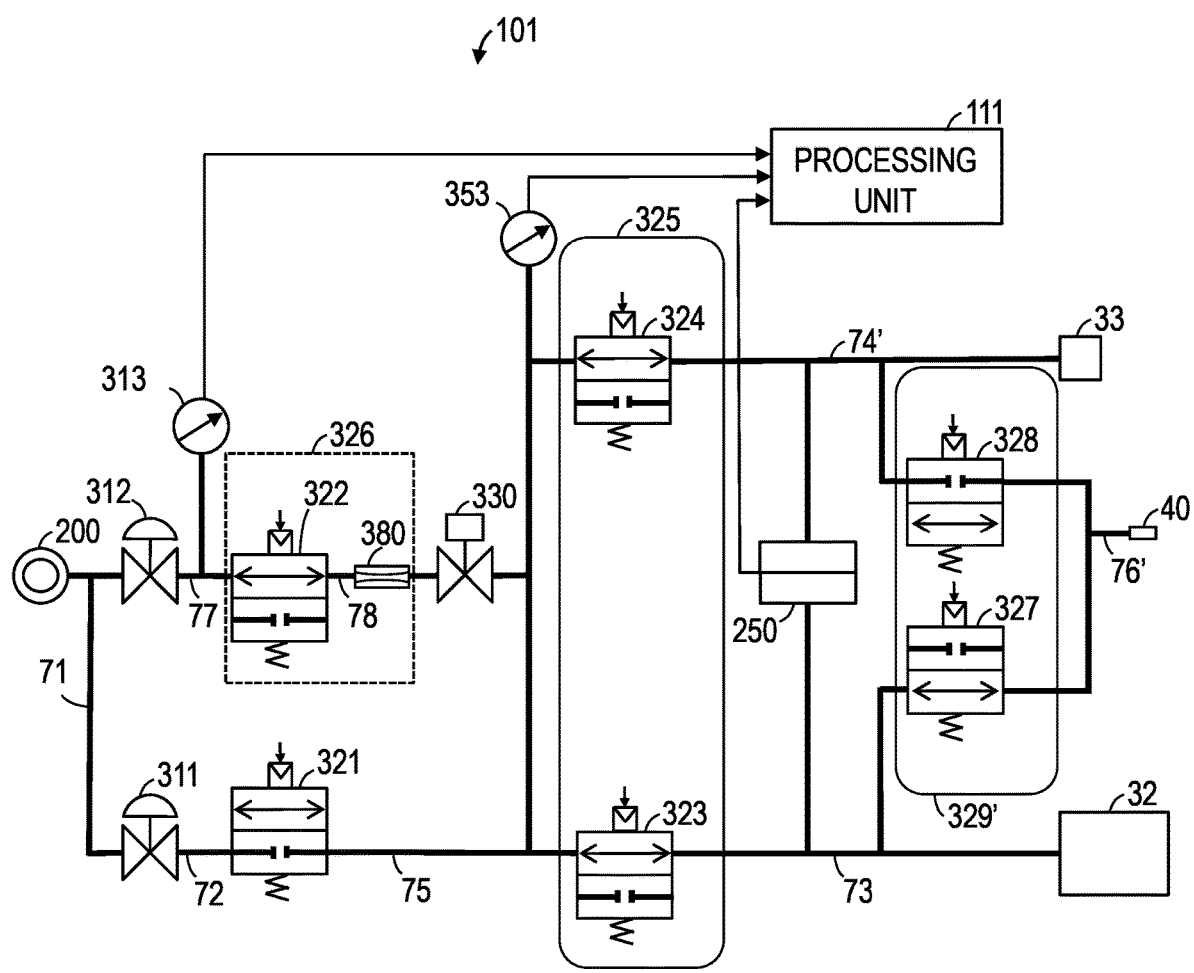
FIG. 14 shows the state of the gas leak sensing device in the first modification when the equal pressure valve is opened and the constant flow rate control valve is opened, with a workpiece-side gas circuit and outside open to each other while keeping a master-side gas circuit and the outside closed from each other.

FIG. 12 shows the state of the gas circuits in the gas leak sensing device 101 during processing with the constant flow rate control valve 326. This state is when the equal pressure valve 325 is opened and the exhaust valve 329' is closed. In this state, a gas circuit 80' is formed. FIG. 12 corresponds to FIG. 3 in the first embodiment. A difference is that processing unit 111 also controls the control valve 328. FIG. 13 shows the state of the gas circuits when the equal pressure valve 325 and the exhaust valve 329' are closed. In this state, gas circuit 81 and a gas circuit 82' are formed. FIG. 13 corresponds to FIG. 7 in the first embodiment. A difference is that processing unit 111 also controls the control valve 328. FIG. 14 shows a state where the equal pressure valve 325 is opened, the control valve 327 of the exhaust valve 329' is opened with the control valve 328 in a closed state, and the constant flow rate control valve 326 is opened. That is, the exhaust valve 329' can perform opening and closing between the workpiece-side gas circuit 73 and the outside while keeping the master-side gas circuit 74' and the outside closed from each other. FIG. 14 corresponds to FIG. 8 in the first embodiment. Again in the case of FIG. 14, the equivalent circuit shown in FIG. 9 is formed. Thus, it is possible to check whether the differential pressure sensor 250 is normal or not as with the first embodiment.

Figure 15:
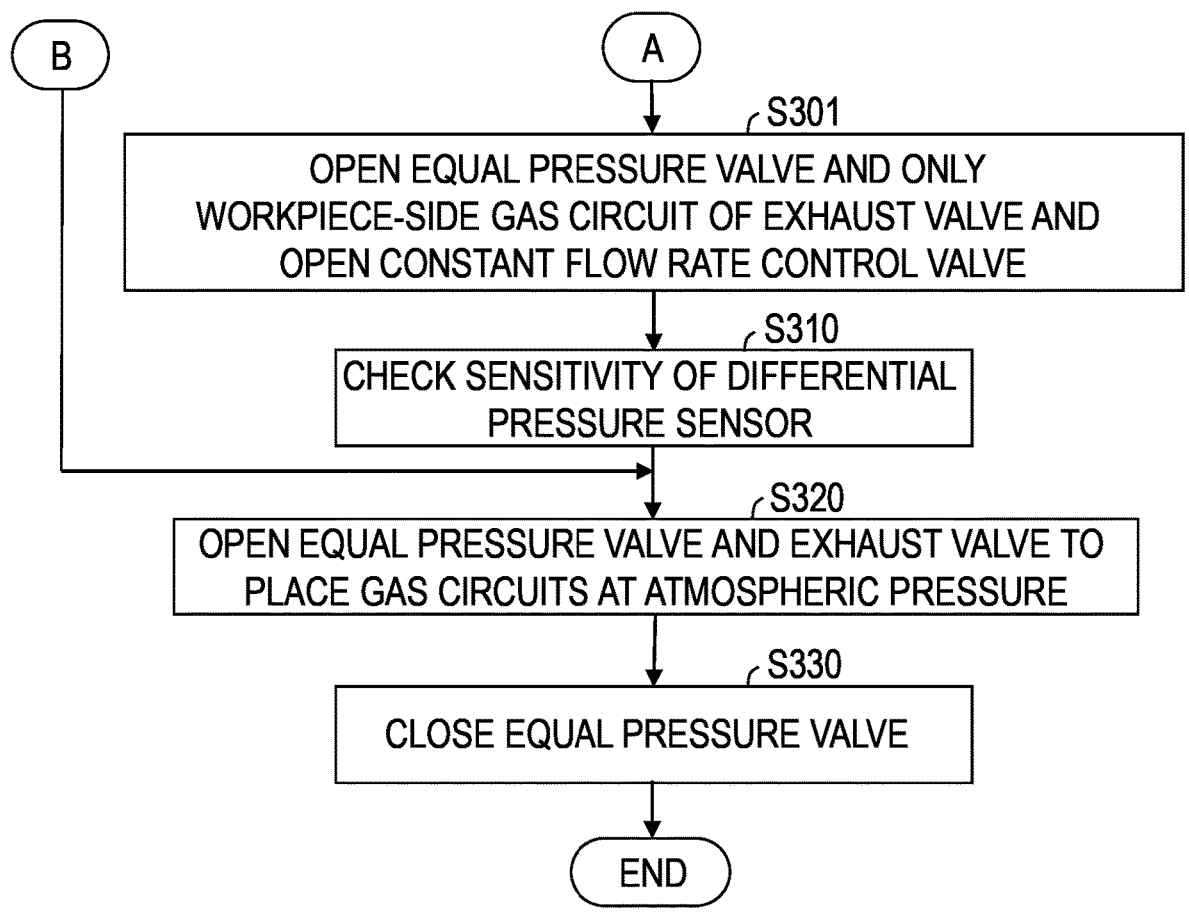
FIG. 15 is a second diagram showing a process flow of a gas leak sensing method with the gas leak sensing device in the first modification.

The process flow of a setting method for gas leak sensing with the gas leak sensing device 101 is the same as FIG. 4. The portion in FIG. 5 of the process flow of a gas leak sensing method with the gas leak sensing device 101 is the same as in the first embodiment. In the process flow shown in FIGS. 4 and 5, the control valve 328 is controlled similarly to the control valve 327. FIG. 15 shows a portion continued from the process flow (FIG. 5) of the gas leak sensing method with the gas leak sensing device 101. FIG. 15 corresponds to FIG. 6 in the first embodiment. In step S301, as shown in FIG. 14, the equal pressure valve 325 is opened and the control valve 327 of the exhaust valve 329' is placed in an open state with the control valve 328 closed. Then, the constant flow rate control valve 326 is opened. Except for step S301 in the processes shown in FIGS. 4, 5, and 15, both the control valve 327 and the control valve 328 may be closed when the exhaust valve 329' is closed, and both the control valve 327 and the control valve 328 may be opened when the exhaust valve 329' is opened.

The gas leak sensing device and gas leak sensing method in the first modification are capable of testing the gas leak sensing device in a short time with a workpiece under test connected to the gas leak sensing device as with the first embodiment. Thus, a leak test section (the gas leak sensing device itself and the portion where the workpiece under test is attached) can be tested every time a workpiece under test is attached. Accordingly, the reliability of gas leak sensing can be improved compared to conventional testing of gas leak sensing devices, which is performed once per multiple executions of tests on workpieces under test. Also, using an equivalent internal volume determined by utilizing a non-defective workpiece as the large leak reference volume, it is possible to sense a case where the internal volume of a workpiece under test is different from that of a non-defective workpiece under test. Further, the setting method for gas leak sensing in the first modification can set an environment in which the foregoing gas leak sensing method can be performed.

While the first modification also described gas leak sensing of internal pressure type, which performs a leakage test by supplying gas to the inside of the workpiece under test, it can also be applied to gas leak sensing of external pressure type, which performs a leakage test by supplying gas to the outside of the workpiece under test. In the case of gas leak sensing of external pressure type, a non-defective workpiece or the workpiece under test 32 is housed in a chamber connected with the workpiece-side gas circuit 73.

[Program and Tangible Medium]

Figure 16:
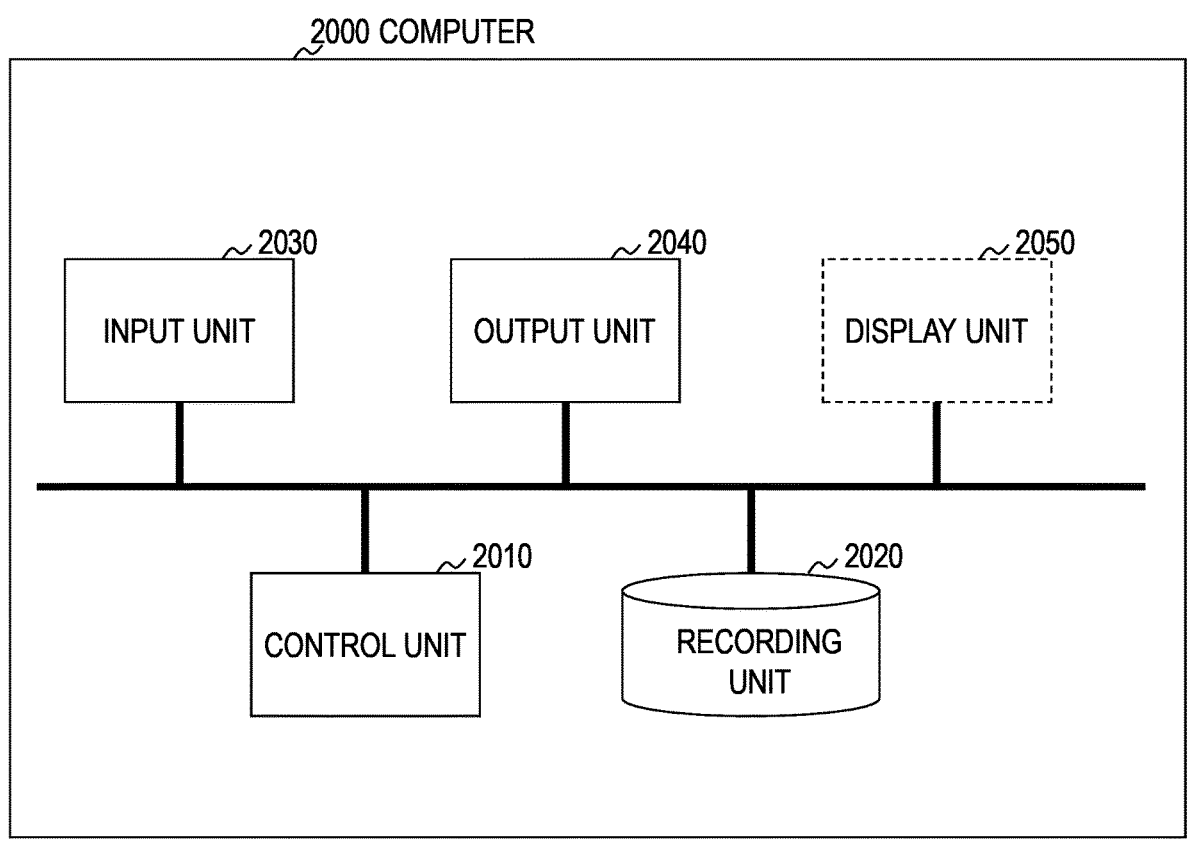
FIG. 16 shows an example of the functional configuration of a computer.

The above-described processing performed by the processing unit 110 can be implemented by making a recording unit 2020 of a computer 2000 shown in FIG. 16 read a program for execution of each step and making a control unit 2010, an input unit 2030, an output unit 2040, a display unit 2050, and so forth operate.

This program in which the contents of processing are written can be recorded in a computer-readable tangible medium. The computer-readable tangible medium may be any medium such as a magnetic recording device, an optical disk, a magneto-optical tangible medium, and a semiconductor memory.

Distribution of this program is implemented by sales, transfer, rental, and other transactions of a portable tangible medium such as a DVD and a CD-ROM on which the program is recorded, for example. Furthermore, this program may be stored in a storage unit of a server computer and transferred from the server computer to other computers via a network to be distributed.

A computer that executes such a program first stores the program recorded in a portable tangible medium or transferred from a server computer once in a storage unit thereof, for example. When the processing is performed, the computer reads out the program stored in the storage unit thereof and performs processing by the program thus readout. As another execution form of this program, the computer may directly read out the program from a portable tangible medium and perform processing by the program. Furthermore, each time the program is transferred to the computer from the server computer, the computer may sequentially perform processing by the received program. Alternatively, a configuration may be adopted in which the transfer of a program to the computer from the server computer is not performed and the above-described processing is executed by the so-called application service provider (ASP)-type service by which the processing functions are implemented only by an instruction for execution thereof and result in acquisition. It should be noted that a program in this form includes information that is provided for processing performed by electronic calculation equipment and which is equivalent to a program (such as data which is not a direct instruction to the computer but has a property specifying the processing performed by the computer).

In this form, the present device is configured with a predetermined program executed on a computer. However, the present device may be configured with at least part of these processing contents realized in a hardware manner.

The foregoing description of the embodiment of the invention has been presented to illustrate and describe. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted by the breadth to which they are fairly, legally, and equitably entitled.

What is claimed is:

1. A gas leak sensing device comprising:
 a constant flow rate control valve that controls the supply of gas of a constant flow rate;
 a pressurization control valve that controls the supply of gas at a test pressure;
 a supply-side gas circuit connected with the constant flow rate control valve and the pressurization control valve;
 a master-side gas circuit to be connected with a master;
 a workpiece-side gas circuit to be connected with a workpiece;
 an equal pressure valve that performs opening and closing between the supply-side gas circuit and the master-side gas circuit and opening and closing between the supply-side gas circuit and the workpiece-side gas circuit;
 an exhaust valve that performs only opening and closing between the workpiece-side gas circuit and outside;
 a test pressure sensor that detects a pressure in the supply-side gas circuit;
 a differential pressure sensor that detects a differential pressure between the master-side gas circuit and the workpiece-side gas circuit; and
 a processor configured to check whether the pressure difference detected by the differential pressure sensor is in a normal range while supplying gas with the equal pressure valve open, the exhaust valve open, and the constant flow rate control valve open.

2. The gas leak sensing device according to claim 1, wherein a sonic nozzle is used for supplying the gas of the constant flow rate.

3. The gas leak sensing device according to claim 1, wherein the exhaust valve is a normally open air-operated valve.

4. The gas leak sensing device according to claim 3, wherein the equal pressure valve is a normally closed air-operated valve.

5. A gas leak sensing device comprising:
 a constant flow rate control valve that controls the supply of gas of a constant flow rate;
 a pressurization control valve that controls the supply of gas at a test pressure;
 a supply-side gas circuit connected with the constant flow rate control valve and the pressurization control valve;
 a master-side gas circuit to be connected with a master;
 a workpiece-side gas circuit to be connected with a workpiece;
 an equal pressure valve that performs opening and closing between the supply-side gas circuit and the master-side gas circuit and opening and closing between the supply-side gas circuit and the workpiece-side gas circuit;
 an exhaust valve that is capable of performing opening and closing between the workpiece-side gas circuit and outside while keeping the master-side gas circuit and the outside closed from each other;
 a test pressure sensor that detects a pressure in the supply-side gas circuit;
 a differential pressure sensor that detects a differential pressure between the master-side gas circuit and the workpiece-side gas circuit; and
 a processor configured to check whether the pressure difference detected by the differential pressure sensor is in a normal range while supplying gas with the equal pressure valve open, the exhaust valve opened such that the workpiece-side gas circuit and outside are opened to each other while keeping the master-side gas circuit and the outside closed from each other, and the constant flow rate control valve open.

6. The gas leak sensing device according to claim 5, wherein a sonic nozzle is used for supplying the gas of the constant flow rate.

7. The gas leak sensing device according to claim 5, wherein the exhaust valve is a normally open air-operated valve.

8. The gas leak sensing device according to claim 7, wherein the equal pressure valve is a normally closed air-operated valve.

9. A setting method for gas leak sensing with a gas leak sensing device comprising:
   a constant flow rate control valve that controls the supply of gas of a constant flow rate;
   a pressurization control valve that controls the supply of gas at a test pressure;
   a supply-side gas circuit connected with the constant flow rate control valve and the pressurization control valve;
   a master-side gas circuit to be connected with a master;
   a workpiece-side gas circuit to be connected with a workpiece;
   an equal pressure valve that performs opening and closing between the supply-side gas circuit and the master-side gas circuit and opening and closing between the supply-side gas circuit and the workpiece-side gas circuit;
   an exhaust valve that performs only opening and closing between the workpiece-side gas circuit and outside;
   a test pressure sensor that detects a pressure in the supply-side gas circuit; and
   a differential pressure sensor that detects a differential pressure between the master-side gas circuit and the workpiece-side gas circuit, wherein
   a non-defective workpiece is connected to the workpiece-side gas circuit, with the equal pressure valve opens and the exhaust valve closed,
   an equivalent internal volume is determined as a large leak reference volume by a pressure that is detected by the test pressure sensor when gas is supplied by opening the constant flow rate control valve for a first predetermined time, and
   based on the equivalent internal volume, an equivalent internal volume of the workpiece-side gas circuit with the non-defective workpiece connected thereto is determined as a workpiece-side reference volume.

10. A non-transitory tangible medium having recorded thereon a program for causing a computer to execute the setting method for gas leak sensing according to claim 9.

11. A setting method for gas leak sensing with a gas leak sensing device comprising:
    a constant flow rate control valve that controls the supply of gas of a constant flow rate;
    a pressurization control valve that controls the supply of gas at a test pressure;
    a supply-side gas circuit connected with the constant flow rate control valve and the pressurization control valve;
    a master-side gas circuit to be connected with a master;
    a workpiece-side gas circuit to be connected with a workpiece;
    an equal pressure valve that performs opening and closing between the supply-side gas circuit and the master-side gas circuit and opening and closing between the supply-side gas circuit and the workpiece-side gas circuit;
    an exhaust valve that is capable of performing opening and closing between the workpiece-side gas circuit and outside while keeping the master-side gas circuit and the outside closed from each other;
    a test pressure sensor that detects a pressure in the supply-side gas circuit; and
    a differential pressure sensor that detects a differential pressure between the master-side gas circuit and the workpiece-side gas circuit, wherein
    a non-defective workpiece is connected to the workpiece-side gas circuit, with the equal pressure valve opens and the exhaust valve closed,
    an equivalent internal volume is determined as a large leak reference volume by a pressure that is detected by the test pressure sensor when gas is supplied by opening the constant flow rate control valve for a first predetermined time, and
    based on the equivalent internal volume, an equivalent internal volume of the workpiece-side gas circuit with the non-defective workpiece connected thereto is determined as a workpiece-side reference volume.

12. A non-transitory tangible medium having recorded thereon a program for causing a computer to execute the setting method for gas leak sensing according to claim 11.

13. A gas leak sensing method with a gas leak sensing device comprising:
    a constant flow rate control valve that controls the supply of gas of a constant flow rate;
    a pressurization control valve that controls the supply of gas at a test pressure;
    a supply-side gas circuit connected with the constant flow rate control valve and the pressurization control valve;
    a master-side gas circuit to be connected with a master;
    a workpiece-side gas circuit to be connected with a workpiece;
    an equal pressure valve that performs opening and closing between the supply-side gas circuit and the master-side gas circuit and opening and closing between the supply-side gas circuit and the workpiece-side gas circuit;
    an exhaust valve that performs only opening and closing between the workpiece-side gas circuit and outside;
    a test pressure sensor that detects a pressure in the supply-side gas circuit; and
    a differential pressure sensor that detects a differential pressure between the master-side gas circuit and the workpiece-side gas circuit, in which
    a non-defective workpiece is connected to the workpiece-side gas circuit, and while having the equal pressure valve opens and the exhaust valve closed, an equivalent internal volume is determined as a large leak reference volume by opening the constant flow rate control valve for a first predetermined time to supply gas, and
    a workpiece under test is connected to the workpiece-side gas circuit,
    the gas leak sensing method comprising:
    sensing a presence or absence of a leak, by, while having the equal pressure valve opens and the exhaust valve closed, opening the constant flow rate control valve for the first predetermined time to supply gas and then closing the constant flow rate control valve, detecting a pressure with the test pressure sensor, and comparing an equivalent internal volume determined based on the detected pressure to the large leak reference volume;
    sensing a presence or absence of a leak, by, while having the equal pressure valve opens and the exhaust valve closed, opening the pressurization control valve for a second predetermined time to supply gas and then closing the pressurization control valve, detecting a pressure with the test pressure sensor, and checking whether a change in the detected pressure is within a predefined normal range;

after detecting the pressure with the test pressure sensor for the second predetermined time and checking whether the change in the detected pressure was within the predefined normal range, detecting a pressure difference with the differential pressure sensor for a predefined amount of time while having the equal pressure valve closed and the exhaust valve closed, and checking the detected pressure difference; and checking whether the pressure difference detected by the differential pressure sensor is in a normal range while supplying gas with the equal pressure valve opens, the exhaust valve open, and the constant flow rate control valve open.

14. The gas leak sensing method according to claim 13, wherein an equivalent internal volume of the workpiece-side gas circuit when the non-defective workpiece is connected thereto is determined as a workpiece-side reference volume, and when detecting the pressure difference with the differential pressure sensor for the predefined amount of time, a virtual leakage flow rate $Q_2$ given a constant temperature is determined using the workpiece-side reference volume on an assumption that the pressure difference detected by the differential pressure sensor is a pressure change in the workpiece-side gas circuit, and presence or absence of a leak is sensed based on the virtual leakage flow rate $Q_2$.

15. A non-transitory tangible medium having recorded thereon a program for causing a computer to execute the gas leak sensing method according to claim 13.

16. A gas leak sensing method with a gas leak sensing device comprising:

a constant flow rate control valve that controls the supply of gas of a constant flow rate;

a pressurization control valve that controls the supply of gas at a test pressure;

a supply-side gas circuit connected with the constant flow rate control valve and the pressurization control valve;

a master-side gas circuit to be connected with a master;

a workpiece-side gas circuit to be connected with a workpiece;

an equal pressure valve that performs opening and closing between the supply-side gas circuit and the master-side gas circuit and opening and closing between the supply-side gas circuit and the workpiece-side gas circuit;

an exhaust valve that is capable of performing opening and closing between the workpiece-side gas circuit and outside while keeping the master-side gas circuit and the outside closed from each other;

a test pressure sensor that detects a pressure in the supply-side gas circuit; and a differential pressure sensor that detects a differential pressure between the master-side gas circuit and the workpiece-side gas circuit, in which a non-defective workpiece is connected to the workpiece-side gas circuit, and while having the equal pressure valve opens and the exhaust valve closed, an equivalent internal volume is determined as a large leak reference volume by opening the constant flow rate control valve for a first predetermined time to supply gas, and a workpiece under test is connected to the workpiece-side gas circuit, the gas leak sensing method comprising:

sensing a presence or absence of a leak, by, while having the equal pressure valve opens and the exhaust valve closed, opening the constant flow rate control valve for the first predetermined time to supply gas and then closing the constant flow rate control valve, detecting a pressure with the test pressure sensor, and comparing an equivalent internal volume determined based on the detected pressure to the large leak reference volume;

sensing a presence or absence of a leak, by, while having the equal pressure valve opens and the exhaust valve closed, opening the pressurization control valve for a second predetermined time to supply gas and then closing the pressurization control valve, detecting a pressure with the test pressure sensor, and checking whether a change in the detected pressure is within a predefined normal range;

after detecting the pressure with the test pressure sensor for the second predetermined time and checking whether the change in the detected pressure was within the predefined normal range, detecting a pressure difference with the differential pressure sensor for a predefined amount of time while having the equal pressure valve closed and the exhaust valve closed, and checking the detected pressure difference; and checking whether the pressure difference detected by the differential pressure sensor is in a normal range while supplying gas with the equal pressure valve open, the exhaust valve opened such that the workpiece-side gas circuit and outside are opened to each other while keeping the master-side gas circuit and the outside closed from each other, and the constant flow rate control valve open.

17. The gas leak sensing method according to claim 16, wherein an equivalent internal volume of the workpiece-side gas circuit when the non-defective workpiece is connected thereto is determined as a workpiece-side reference volume, and when detecting the pressure difference with the differential pressure sensor for the predefined amount of time, a virtual leakage flow rate $Q_2$ given a constant temperature is determined using the workpiece-side reference volume on an assumption that the pressure difference detected by the differential pressure sensor is a pressure change in the workpiece-side gas circuit, and presence or absence of a leak is sensed based on the virtual leakage flow rate $Q_2$.

18. A non-transitory tangible medium having recorded thereon a program for causing a computer to execute the gas leak sensing method according to claim 5.

* * * * *